US012615649B2

(12) United States Patent
Babaei

(10) Patent No.: US 12,615,649 B2
(45) Date of Patent: Apr. 28, 2026

(54) SYSTEM INFORMATION FOR MULTICAST BROADCAST SERVICES

(71) Applicant: Toyota Jidosha Kabushiki Kaisha, Toyota (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/096,539

(22) Filed: Mar. 31, 2025

(65) Prior Publication Data

US 2025/0227735 A1 Jul. 10, 2025

Related U.S. Application Data

(63) Continuation of application No. 18/575,140, filed as application No. PCT/US2022/034935 on Jun. 24, 2022.

(Continued)

(51) Int. Cl.
*H04W 72/30* (2023.01)
*H04W 72/0457* (2023.01)
(Continued)

(52) U.S. Cl.
CPC ....... *H04W 72/30* (2023.01); *H04W 72/0457* (2023.01); *H04W 72/1273* (2013.01); *H04W 76/40* (2018.02)

(58) Field of Classification Search
CPC . H04W 72/30; H04W 76/40; H04W 72/0457; H04W 72/1273; H04W 4/06; H04W 24/10; H04W 74/0833
See application file for complete search history.

(56) References Cited

U.S. PATENT DOCUMENTS

2015/0327156 A1* 11/2015 Ramkumar ............. H04L 5/001
370/312
2017/0048893 A1* 2/2017 Koskinen .............. H04W 48/10
(Continued)

FOREIGN PATENT DOCUMENTS

KR 10-2021-0035043 A 3/2021
WO WO 2015/169371 A1 11/2015
(Continued)

OTHER PUBLICATIONS

3GPP TSG RAN WG2 #114-e, "Control plane aspects for delivery mode 2 in NR MBS," R2-2105511, May 11, 2021, 8 Pages.
(Continued)

*Primary Examiner* — Liton Miah
(74) *Attorney, Agent, or Firm* — Finnegan, Henderson, Farabow, Garrett and Dunner, LLP

(57) ABSTRACT

A method of multicast broadcast services (MBS) system information and configuration signaling includes receiving, by a user equipment (UE) from a base station (BS), a plurality of system information blocks (SIBs) including a first SIB associated with one or more MBS services, wherein the first SIB comprises scheduling information for reception of MBS control configuration parameters; receiving an MBS control channel comprising scheduling information for reception of an MBS traffic channel via a first cell; and receiving MBS data based on the scheduling information for reception of the MBS traffic channel.

12 Claims, 25 Drawing Sheets

Related U.S. Application Data

(60) Provisional application No. 63/216,097, filed on Jun. 29, 2021.

(51) Int. Cl.
*H04W 72/1273* (2023.01)
*H04W 76/40* (2018.01)

(56) References Cited

U.S. PATENT DOCUMENTS

| | | | |
|---|---|---|---|
| 2017/0164407 A1 | 6/2017 | Yang et al. | |
| 2018/0013529 A1 | 1/2018 | You et al. | |
| 2018/0139665 A1 | 5/2018 | Park et al. | |
| 2018/0160342 A1 | 6/2018 | Park et al. | |
| 2019/0223156 A1 | 7/2019 | Fujishiro et al. | |
| 2022/0124513 A1 | 4/2022 | Nakamura et al. | |
| 2022/0338291 A1 | 10/2022 | Hong | |
| 2022/0361161 A1* | 11/2022 | Wei | H04W 72/30 |
| 2022/0369411 A1* | 11/2022 | Agiwal | H04L 5/0053 |
| 2023/0051095 A1 | 2/2023 | Wei et al. | |
| 2024/0032073 A1* | 1/2024 | Fujishiro | H04W 48/12 |
| 2024/0089918 A1* | 3/2024 | Shrivastava | H04W 48/18 |

FOREIGN PATENT DOCUMENTS

| | | |
|---|---|---|
| WO | WO 2018/062370 A1 | 4/2018 |
| WO | WO 2020/166411 A1 | 8/2020 |

OTHER PUBLICATIONS

3GPP TSG RAN WG2 #111-e, "Consideration on Idle and Inactive mode Ues," R2-2006597, Aug. 7, 2020, 10 Pages.

3GPP TSG RAN WG2 #113-e, "PTM configuration for NR MBS," R2-2101594, Jan. 15, 2021, 3 Pages.

3GPP TSG RAN WG1 #102-e, "On Basic functions for broadcast/multicast for RRC_Idle/RRC_Inactive UEs," R1-2006175, Aug. 7, 2020, 3 Pages.

* cited by examiner

| Transport channel Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel Logical channel | UL-SCH | RACH |
|---|---|---|
| CCCH | X | |
| DCCH | X | |
| DTCH | X | |

FIG. 3B

| Transport channel Logical channel | SL-BCH | SL-SCH |
|---|---|---|
| SBCCH | X | |
| SCCH | | X |
| STCH | | X |

FIG. 3C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

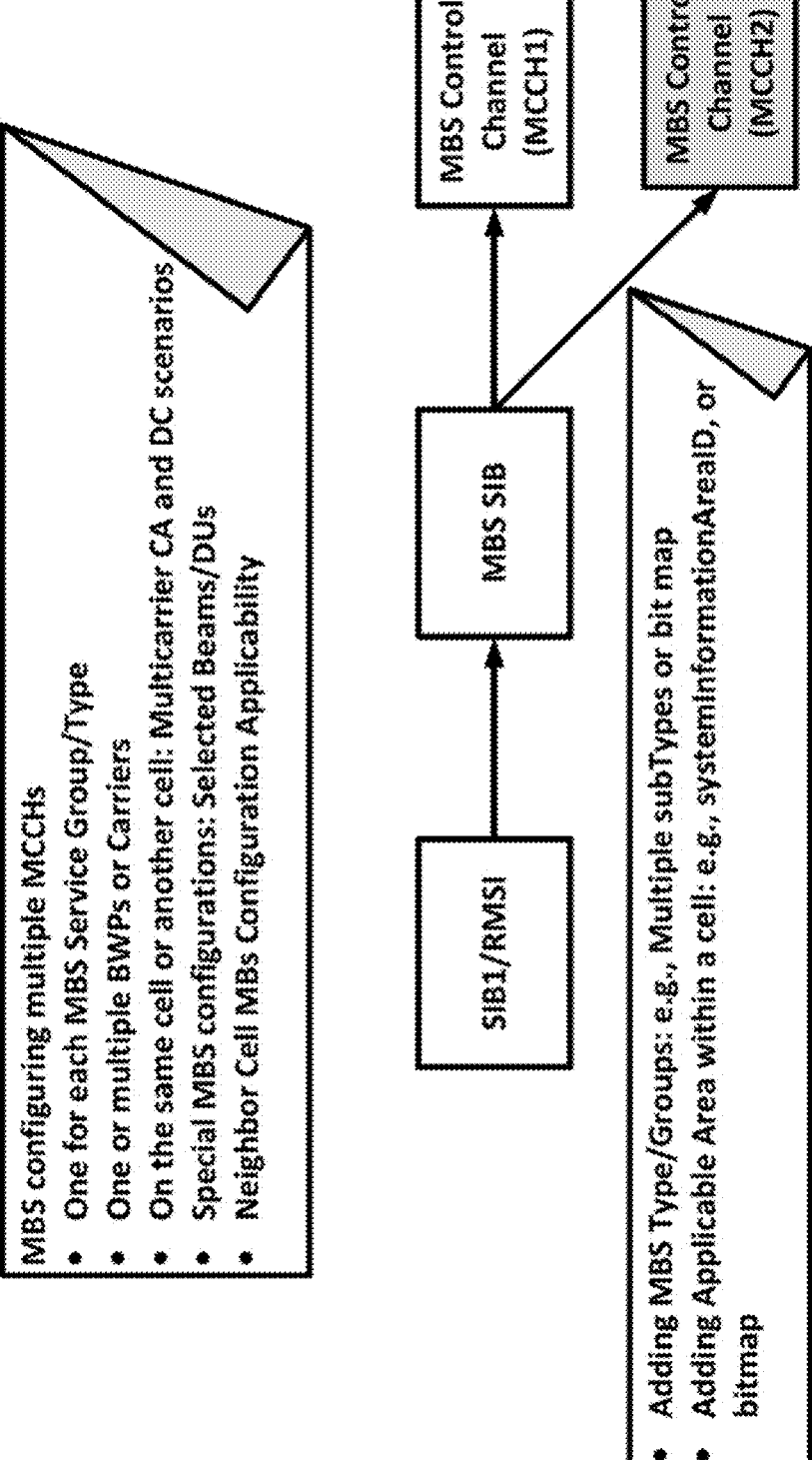

MBS configuring multiple MCCHs
- One for each MBS Service Group/Type
- One or multiple BWPs or Carriers
- On the same cell or another cell: Multicarrier CA and DC scenarios
- Special MBS configurations: Selected Beams/DUs
- Neighbor Cell MBS Configuration Applicability MBS Control Channel (MCCH1)

MBS Control Channel (MCCH2)

MBS SIB

SIB1/RMSI

- Adding MBS Type/Groups: e.g., Multiple subTypes or bit map
- Adding Applicable Area within a cell: e.g., systemInformationAreaID, or bitmap

FIG. 20

SYSTEM INFORMATION FOR MULTICAST BROADCAST SERVICES

CROSS-REFERENCE TO RELATED APPLICATIONS

This application is continuation of U.S. patent application Ser. No. 18/575,140, which is a § 371 national phase of PCT/US2022/034935, filed on Jun. 24, 2022, which claims priority under 35 USC § 119(e) from U.S. provisional application No. 63/216,097, filed on Jun. 29, 2021, each of which is incorporated herein by reference.

BACKGROUND OF THE INVENTION

The present invention is directed to 5G, which is the $5^{th}$ generation mobile network. It is a new global wireless standard after 1G, 2G, 3G, and 4G networks. 5G enables networks designed to connect machines, objects and devices.

The invention is more specifically directed to multicast broadcast services (MBS) system information and configuration signaling whereby a user equipment (UE) receives system information blocks (SIBs) from a base station (BS) including scheduling information for reception of MBS control configuration parameters, an MBS control channel and scheduling information for reception of an MBS traffic channel via a first cell.

SUMMARY OF THE INVENTION

In an embodiment, the invention provides a method of multicast broadcast services (MBS) system information and configuration signaling. The method include receiving, by a user equipment (UE) from a base station (BS), a plurality of system information blocks (SIBs) including a first SIB associated with one or more MBS services, wherein the first SIB comprises scheduling information for reception of MBS control configuration parameters; receiving an MBS control channel comprising scheduling information for reception of an MBS traffic channel via a first cell; and receiving MBS data based on the scheduling information for reception of the MBS traffic channel. The method may include receiving first system information associated with the first cell indicating that at least one system information block (SIB) associated with one or more multicast broadcast services (MBS) services is applicable to the first cell.

The first system information may be based on a system information block one (SIB1) and/or based on a remaining system information (RMSI). The first system information may be received prior to the first system information block (SIB), received via a physical downlink shared channel and/or received via a broadcast channel. For that matter, the first system information block (SIB) may include one or more multicast broadcast services (MBS) configuration parameters. Preferably, the multicast broadcast services (MBS) control channel is associated with a multicast control channel (MCCH) logical channel and/or a multicast traffic channel (MTCH) logical channel. The multicast broadcast services (MBS) data preferably is based on the multicast traffic channel (MTCH) logical channel.

The method also may include receiving multicast broadcast services (MBS) notification signaling indicating a change or an update to the multicast broadcast services (MBS) control configuration parameters. In that case, the receiving multicast broadcast services (MBS) notification signaling can be based on one or more of a paging channel, a broadcast channel and a downlink shared channel. The at least one of the first system information, the first system information block (SIB) and the multicast broadcast services (MBS) control channel preferably are used for transmission of first parameters that are beam-specific or distributed unit (DU)-specific. The base station may comprise a centralized unit (CU) and one or more distributed units (DUs). Preferably, one or more parameters in the at least one of the first system information, the first system information block (SIB) and the multicast broadcast services (MBS) control channel indicate that the first parameters are beam-specific or distributed unit (DU)-specific.

In the method, one or more parameters may indicate one or more beam or distributed unit (DU) identifiers. Similarly, an absence of the one or more parameters indicate that the first parameters are not beam-specific or distributed unit (DU)-specific. At least one of the first system information, the first system information block (SIB) and the multicast broadcast services (MBS) control channel may be used for transmission of first parameters that are MBS service specific. The multicast broadcast services (MBS) service may be associated with one of vehicle to everything (V2X) service type and an internet of things (IoT) service type. The one or more parameters in the at least one of the first system information, the first system information block (SIB) and the multicast broadcast services (MBS) control channel indicate that the first parameters are MBS service specific The one or more parameters may indicate one or more MBS service identifiers, wherein absence of the one or more parameters indicate that the first parameters are not multicast broadcast services (MBS) service specific.

In the method, at least one of the first system information, the first system information block (SIB) and the multicast broadcast services (MBS) control channel preferably are used for transmission of first parameters that are bandwidth part (BWP)-specific. The first cell may be associated with a plurality of bandwidth parts (BWPs). The one or more parameters in the at least one of the first system information, the first system information block (SIB) and the multicast broadcast services (MBS) control channel may indicate that the first parameters are bandwidth part (BWP) specific. The one or more parameters also may indicate one or more bandwidth part (BWP) identifiers. An absence of the one or more parameters may indicate that the first parameters are not bandwidth part (BWP) specific. The first system information block (SIB) comprises information about availability of a first MBS service in a neighboring cell, where the first cell may be a primary cell in a cell group, the cell group may be a master cell group (MCG) provided by a master base station, or alternatively, may be a secondary cell group (SCG) provided by a secondary base station.

In an embodiment, the invention also provides a method of multicast broadcast services (MBS) system information and configuration signaling. The method includes receiving, by a user equipment (UE), a system information scheduling information (SI-SchedulingInfo) information element (IE) including first scheduling information for receiving a first system information block (SIB) that is associated with one or more MBS services; receiving the first SIB based on the first scheduling information; and receiving MBS data based on the first SIB. Receiving the system information may be via a system block one (SIB1) message, may be via remaining system information (RMSI).

In an embodiment, the invention also provides a method of multicast broadcast services (MBS) system information and configuration signaling. The method includes receiving, by a user equipment (UE) from a base station (BS), a first MBS system information block (SIB) via a first cell; determining that a first MBS service group or a first MBS service type is provided by the first cell based on receiving the first MBS SIB; and receiving MBS data, associated with the first MBS service group or the first MBS service type, based on the first MBS SIB. In the method, a plurality of system information blocks (SIBs), comprising the first MBS SIB, are multicast broadcast services (MBS) SIBs; each MBS SIB, in the plurality of MBS SIBs, is associated with a corresponding MBS service group or MBS service type; and the first MBS SIB is associated with the first MBS service group or the first MBS service type. For that matter, the first MBS SIB is a bitmap comprising a plurality of bits, wherein: each bit in the plurality of bits is associated with a corresponding MBS service group or MBS service type; and a first bit, in the plurality of bits, is associated with the first MBS service group or MBS service type; and the determining is based on the first bit having a first value. The first value preferably is one.

In an embodiment, the invention provides a method of multicast broadcast services (MBS) system information and configuration signaling. The method includes receiving, by a user equipment (UE) from a base station (BS), a first MBS-related system information block (SIB) via a first cell; determining that at least one MBS service is provided by a first beam associated with the first cell based on receiving the first MBS-related SIB; and receiving MBS data, via the first beam of the first cell, based on the first MBS-related SIB. As such, the MBS-related SIB comprises a bitmap comprising a plurality of bits, each bit in the plurality of bits is associated with a corresponding beam; a first bit, in the plurality of bits, is associated with the first beam; and the determining is based on the first bit having a first value; the first value may be one.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

FIG. 20 shows an example process according to some aspects of some of various exemplary embodiments of the present disclosure.

DETAILED DESCRIPTION

Figure 1:
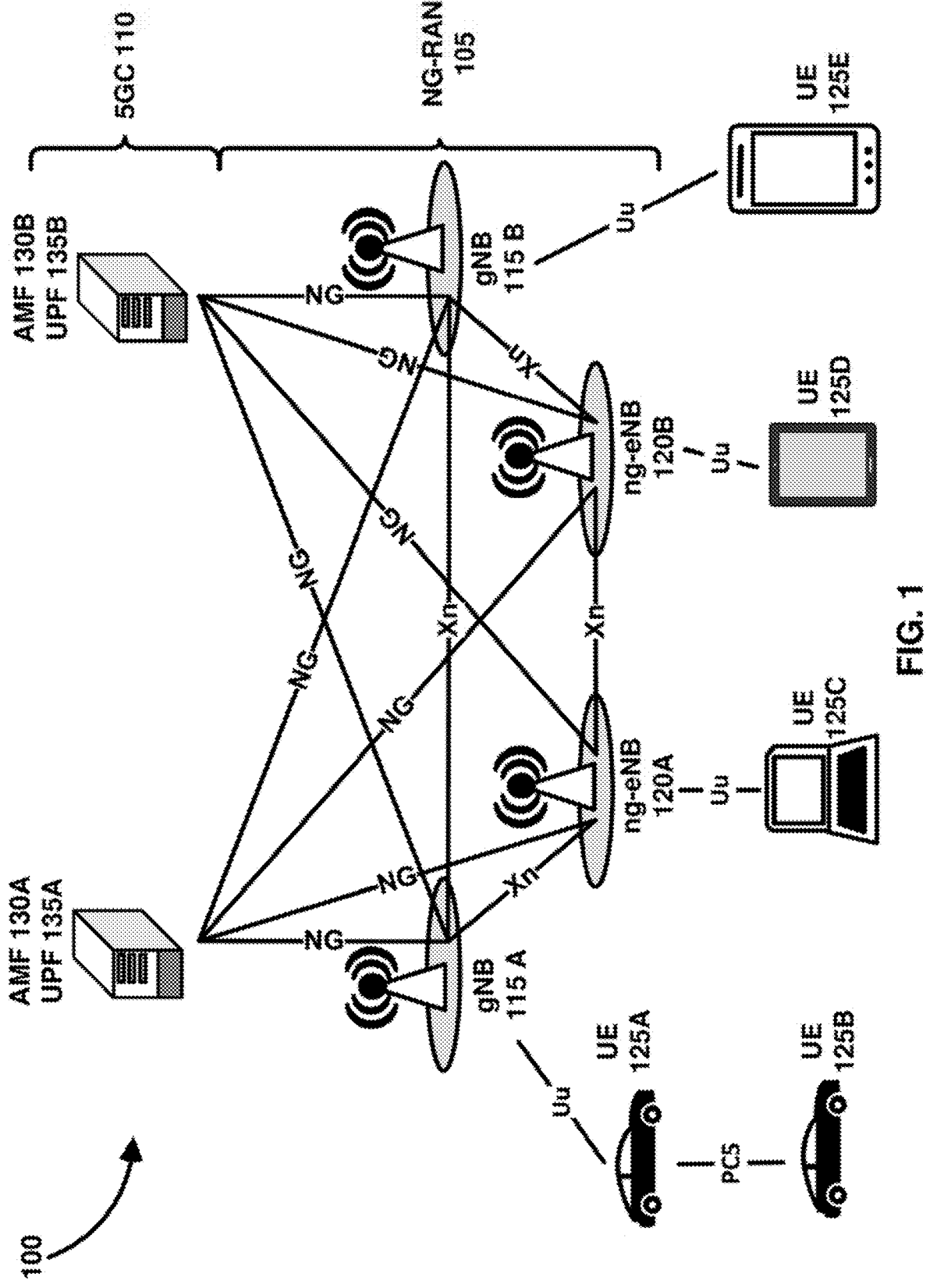
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, HOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport IP layer, point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multihomed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that originates sidelink communication frames. The Destination Layer-2 ID may be a link-layer identity that identifies a device that are recipients of sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
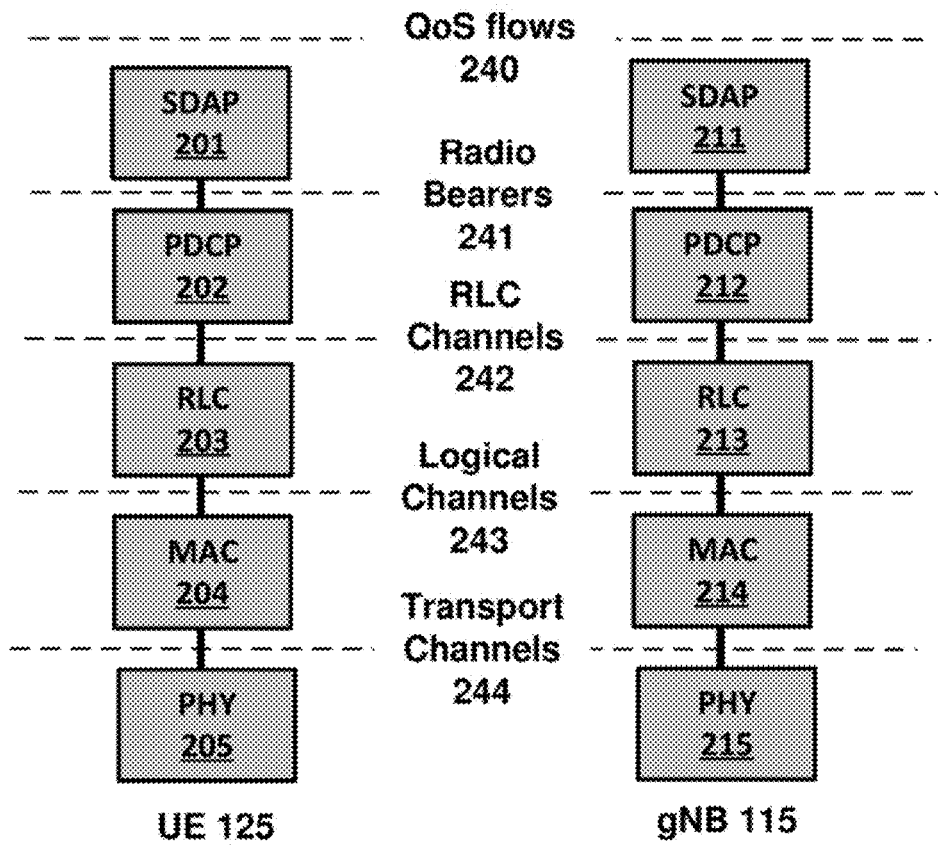
FIG. 2A and FIG. 2B show examples of radio protocol stacks for user plane and control plane, respectively, according to some aspects of some of various exemplary embodiments of the present disclosure.
Figure 2B:
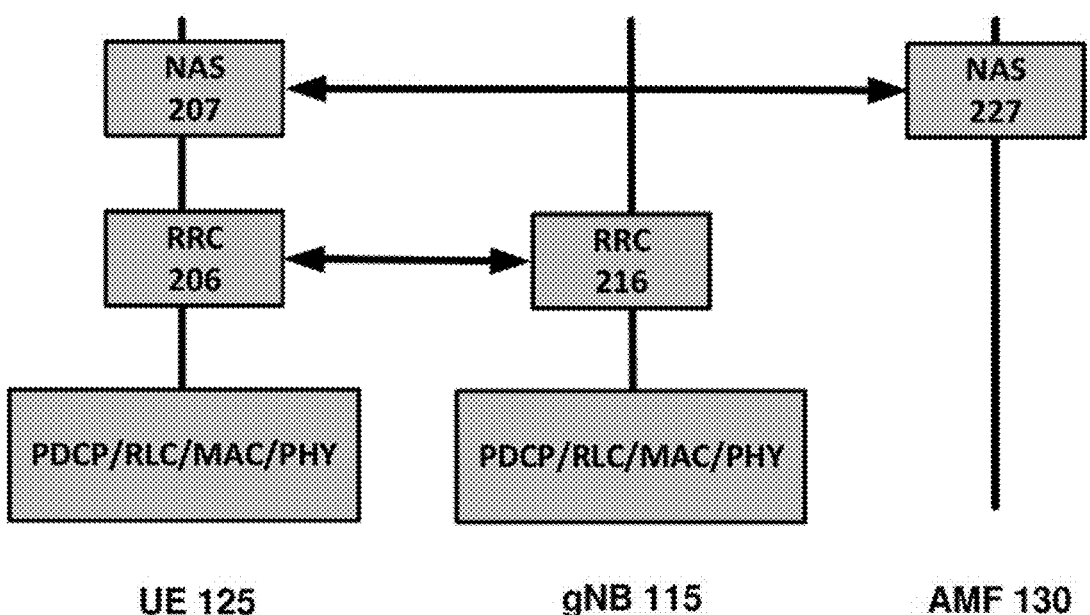

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or more different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

Figures 4A, 4B, 4C:
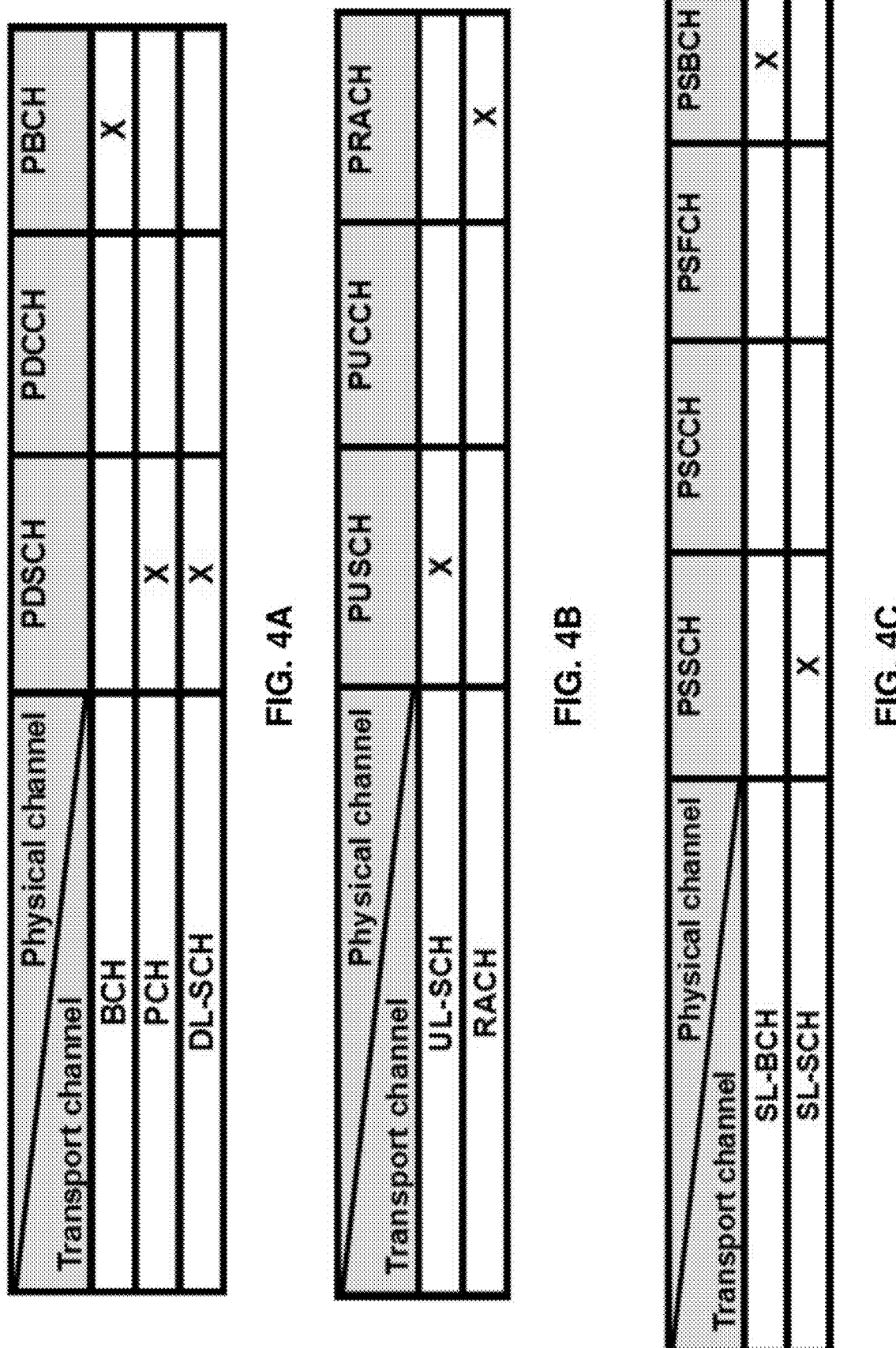
FIG. 4A, FIG. 4B and FIG. 4C show example mappings between transport channels and physical channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figures 5A, 5B, 5C, 5D:
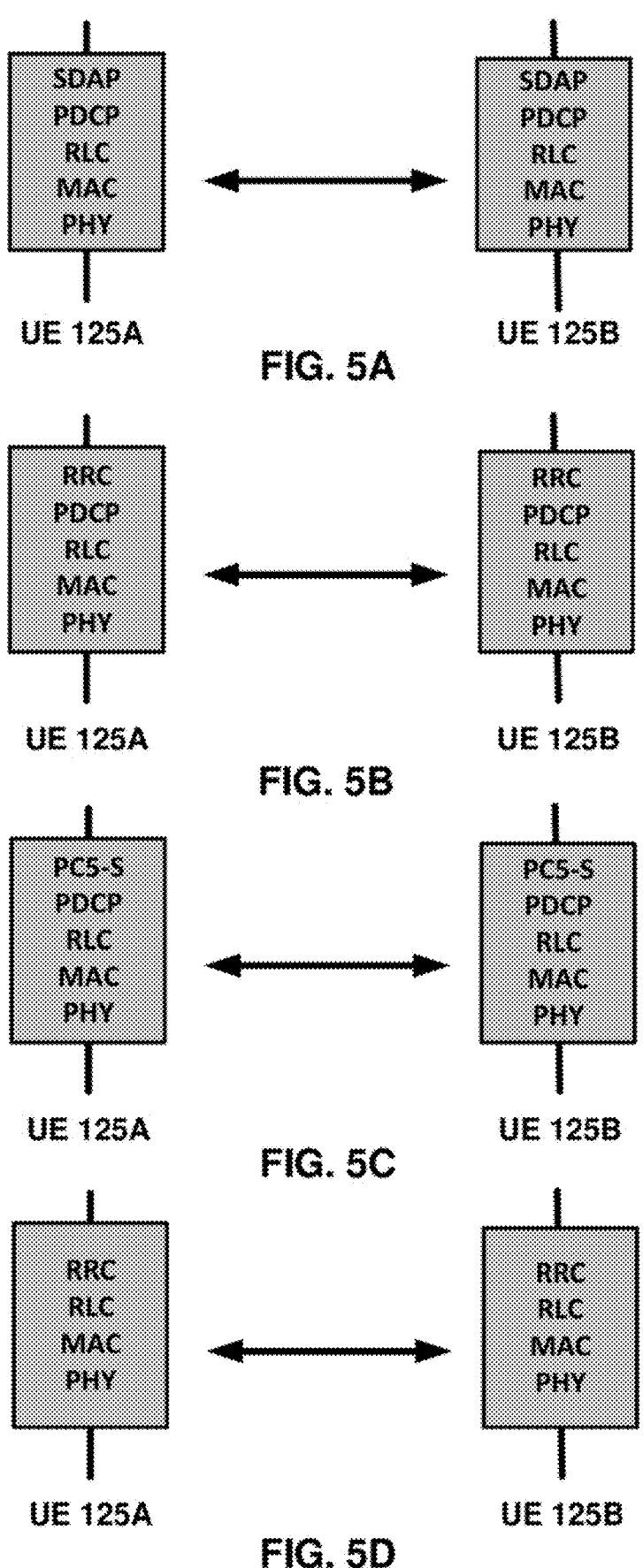
FIG. 5A, FIG. 5B, FIG. 5C and FIG. 5D show examples of radio protocol stacks for NR sidelink communication according to some aspects of some of various exemplary embodiments of the present disclosure.

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bidirectional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
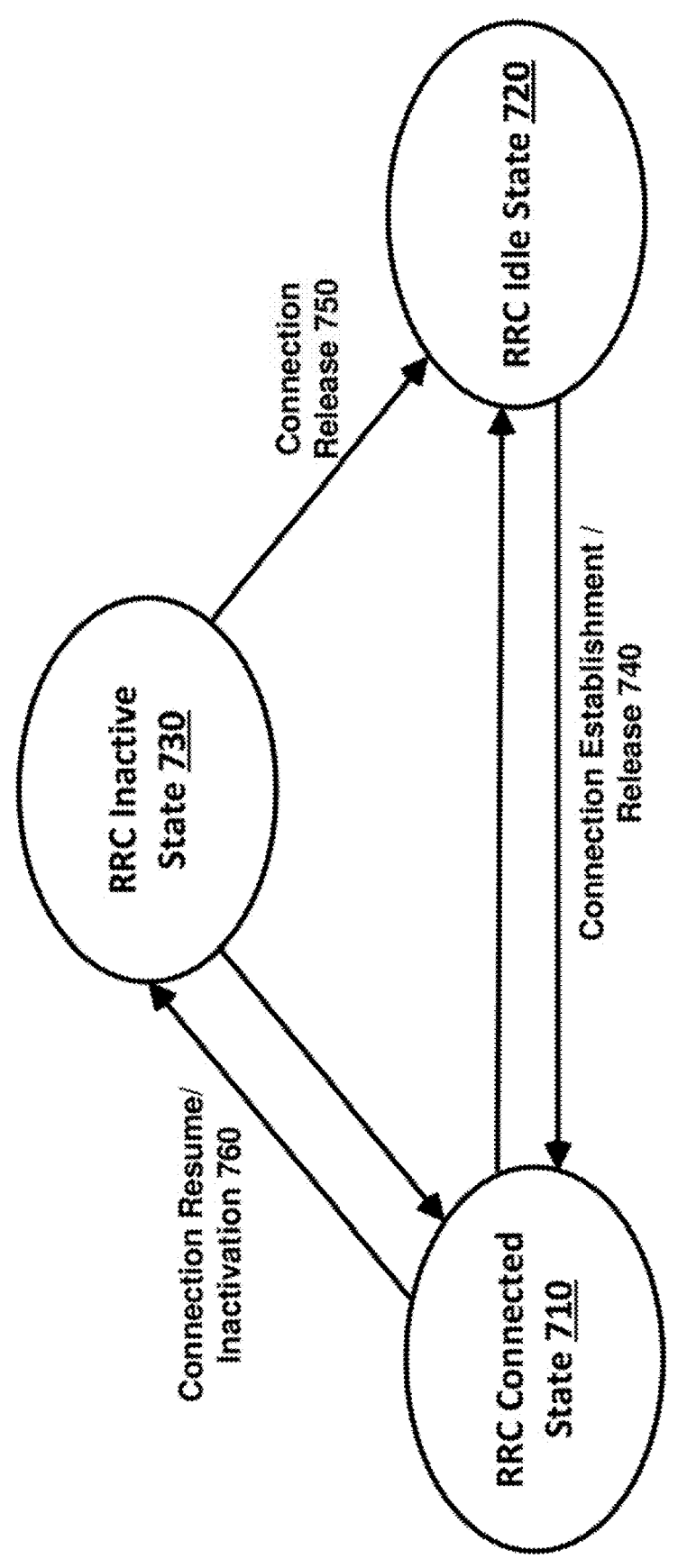
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
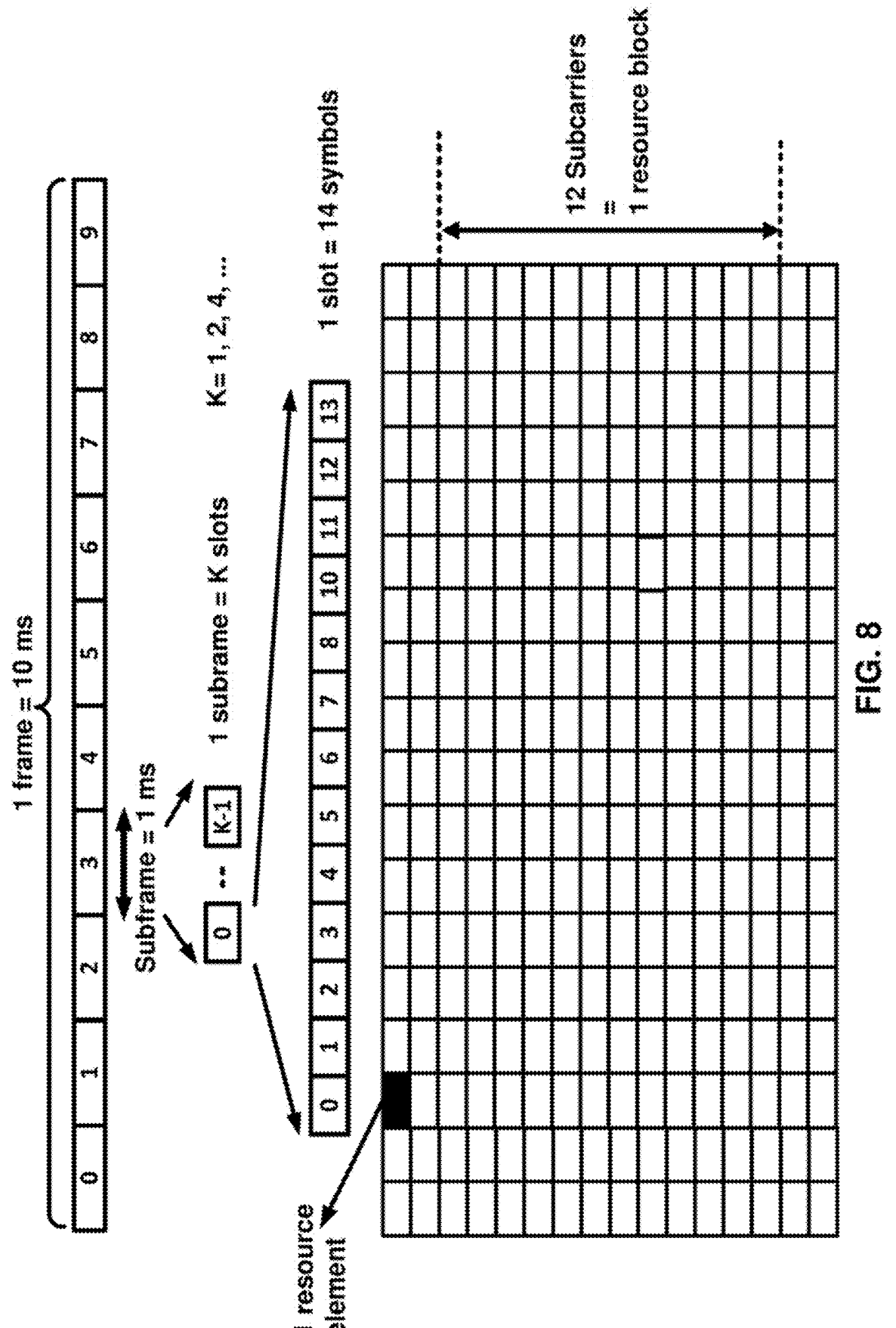
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend on the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
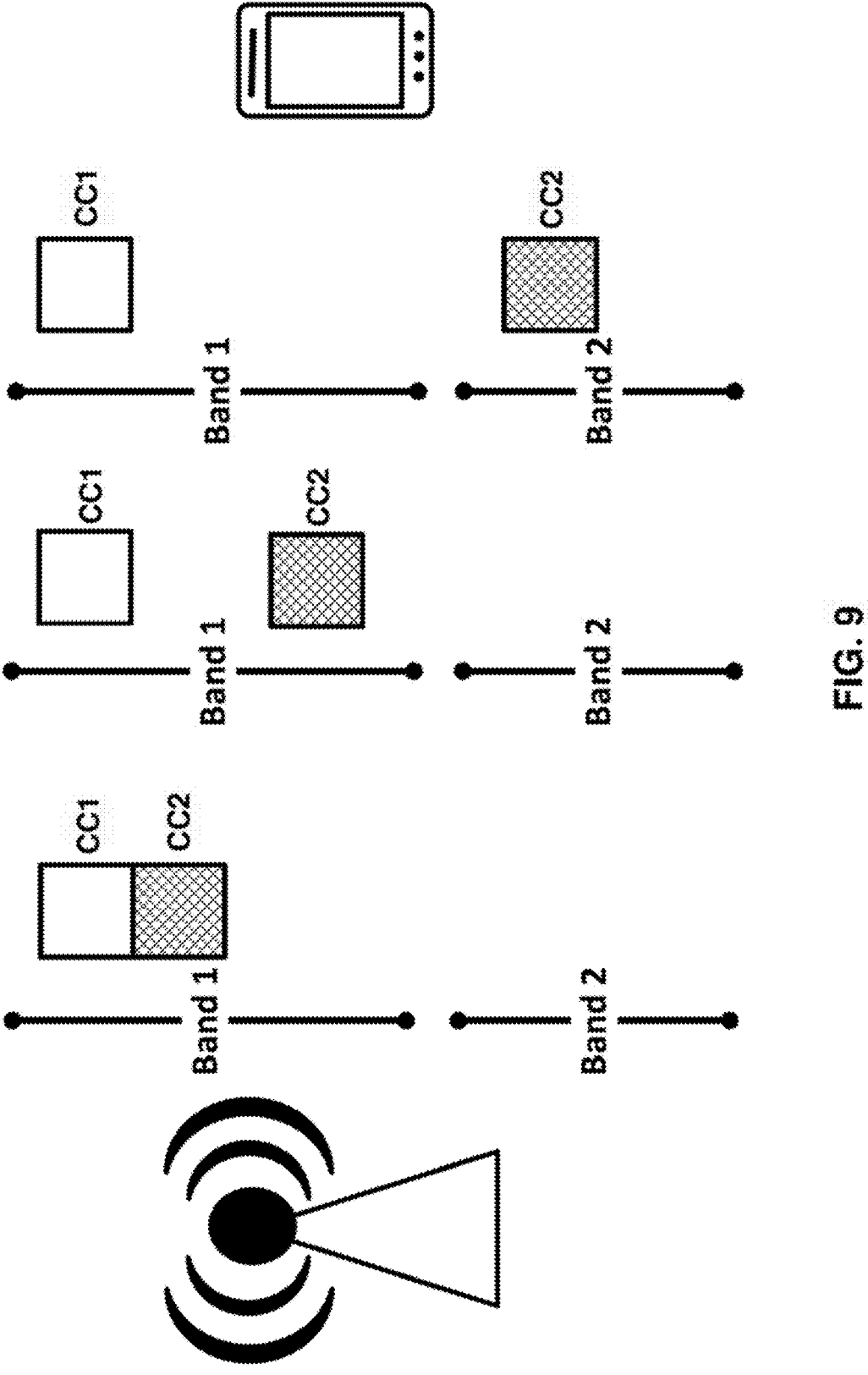
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary Cell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs).

The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
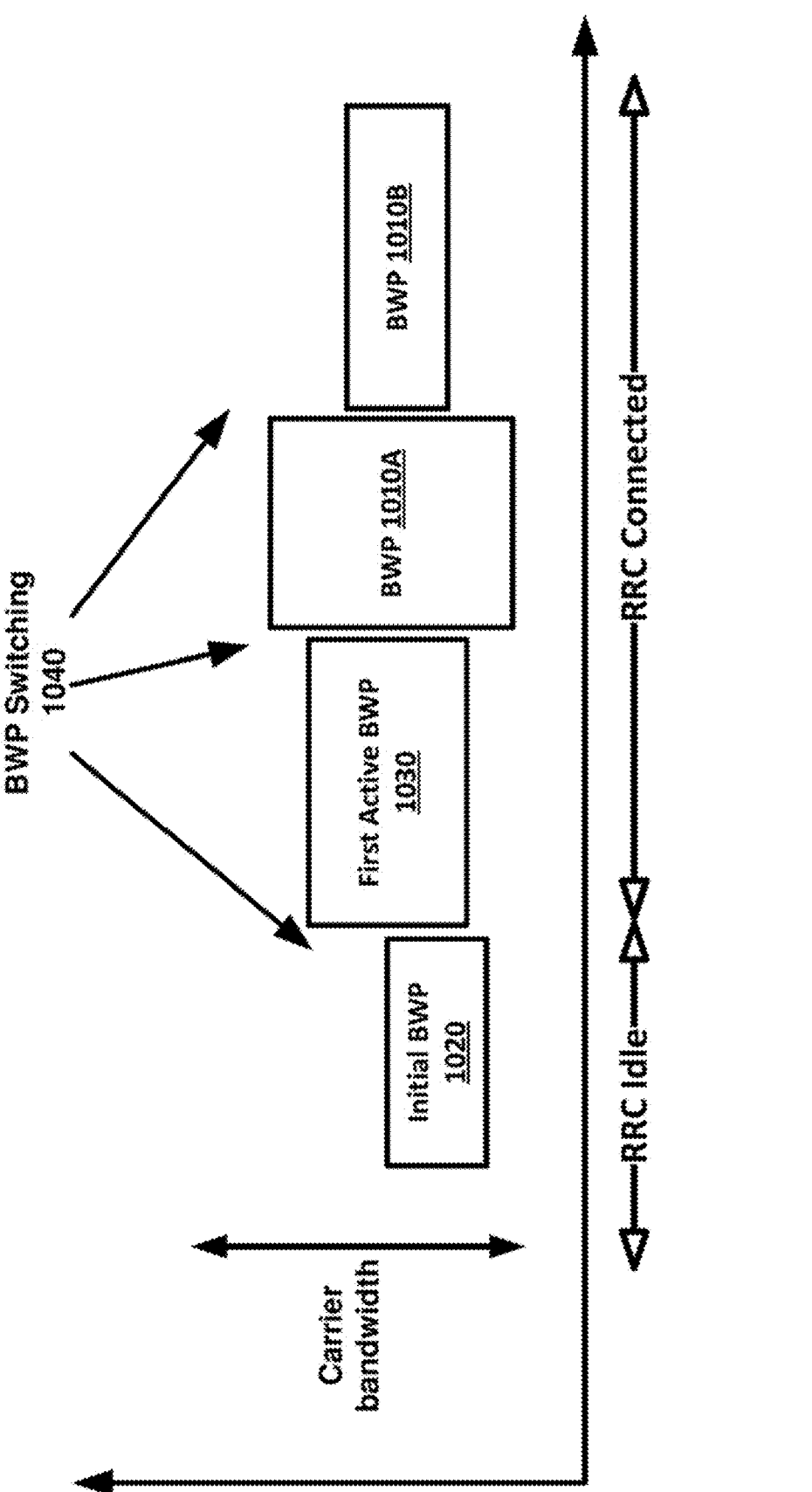
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
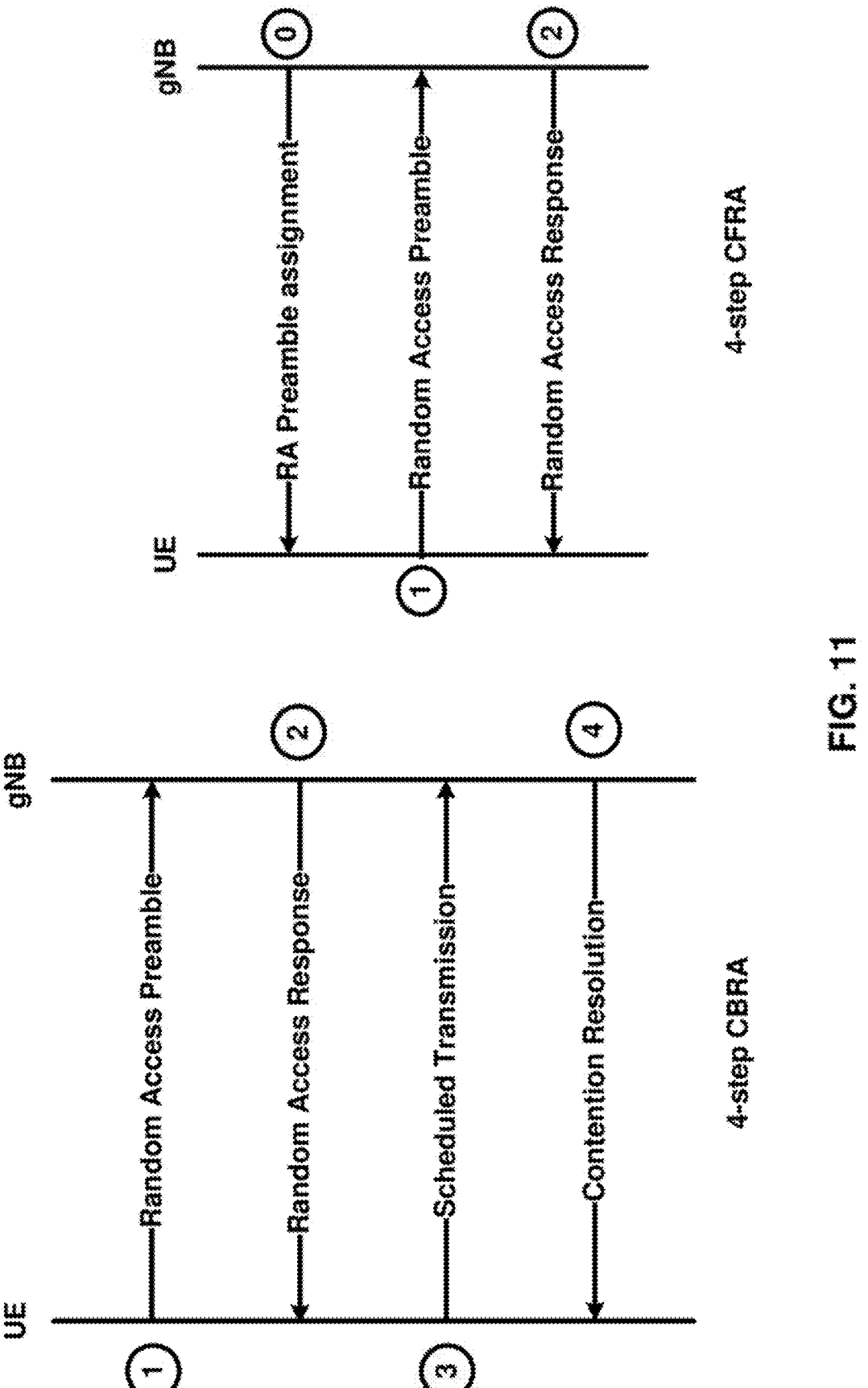
FIG. 11 shows example four-step contention-based and contention-free random access processes according to some aspects of some of various exemplary embodiments of the present disclosure.
Figure 12:
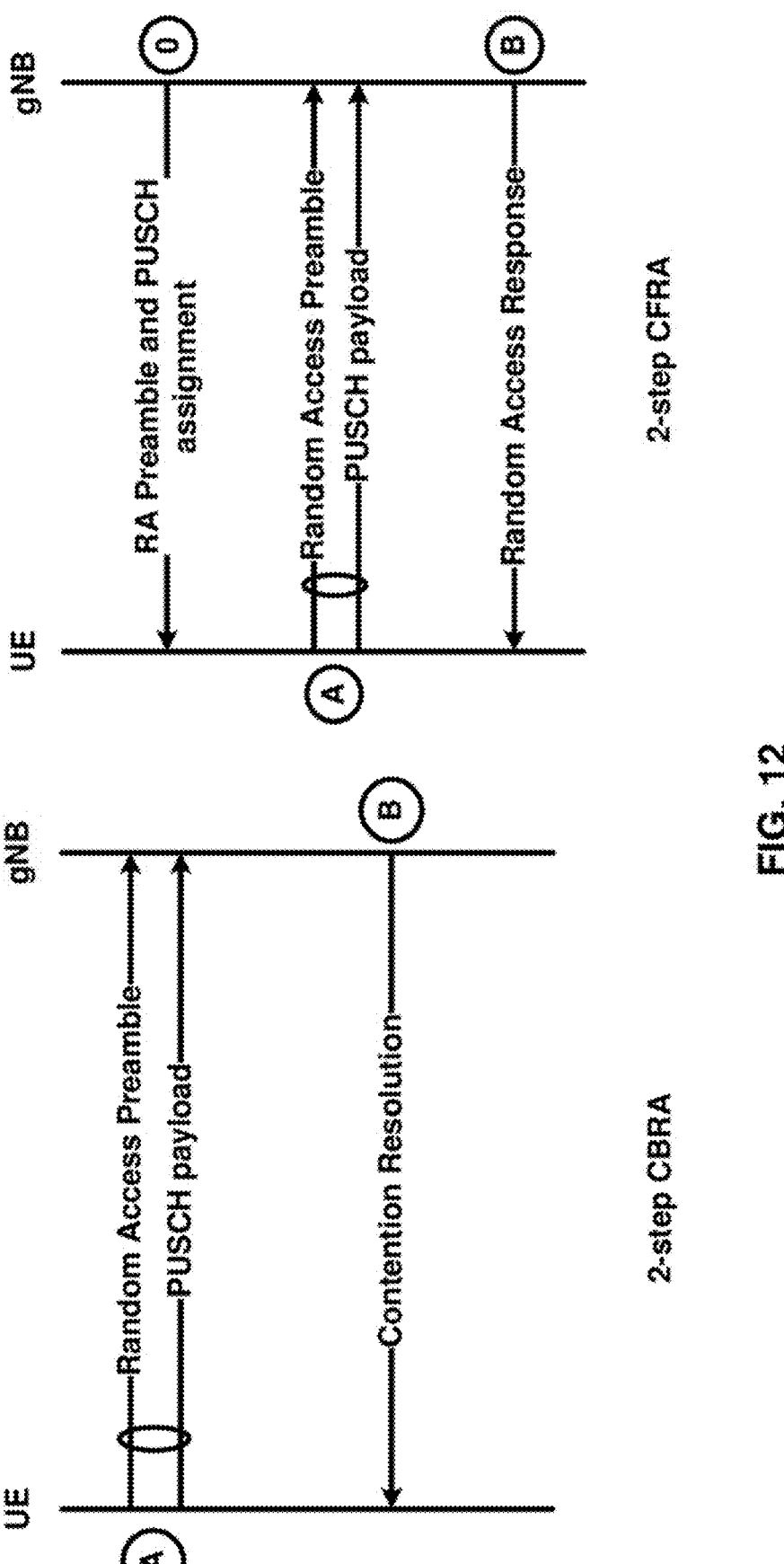
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re)transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
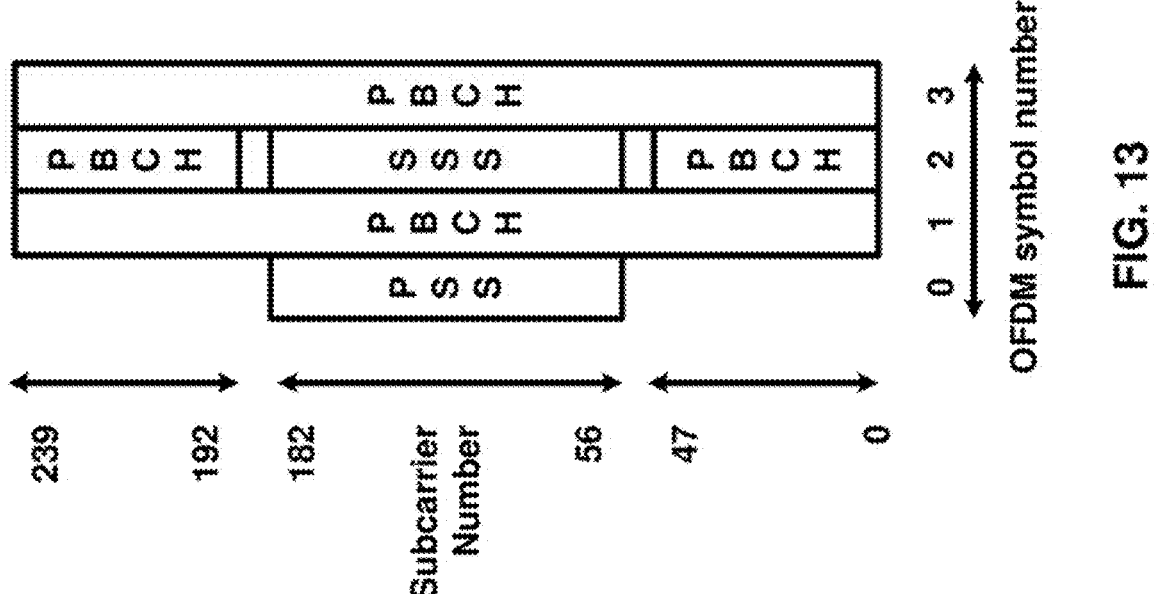
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
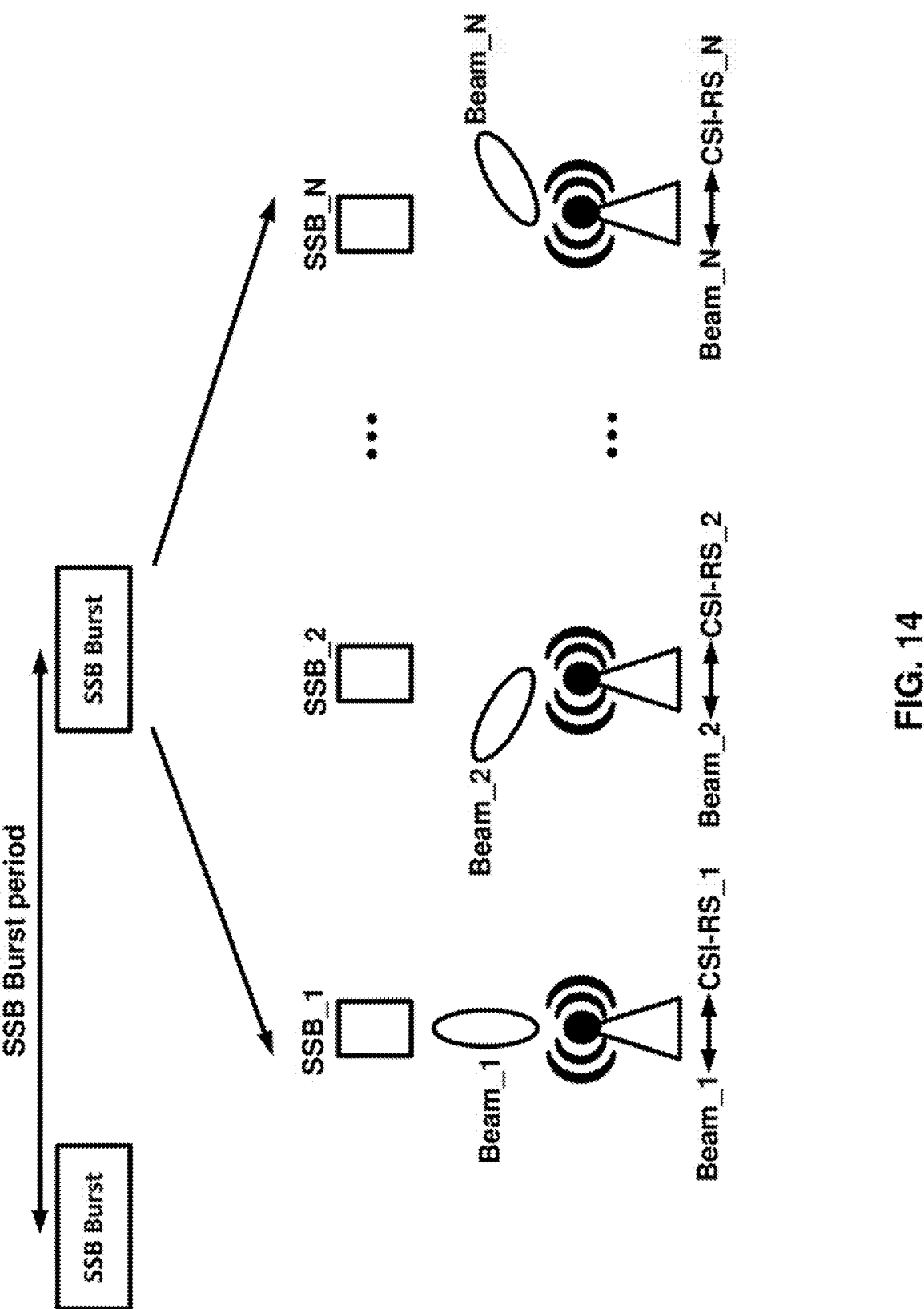
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
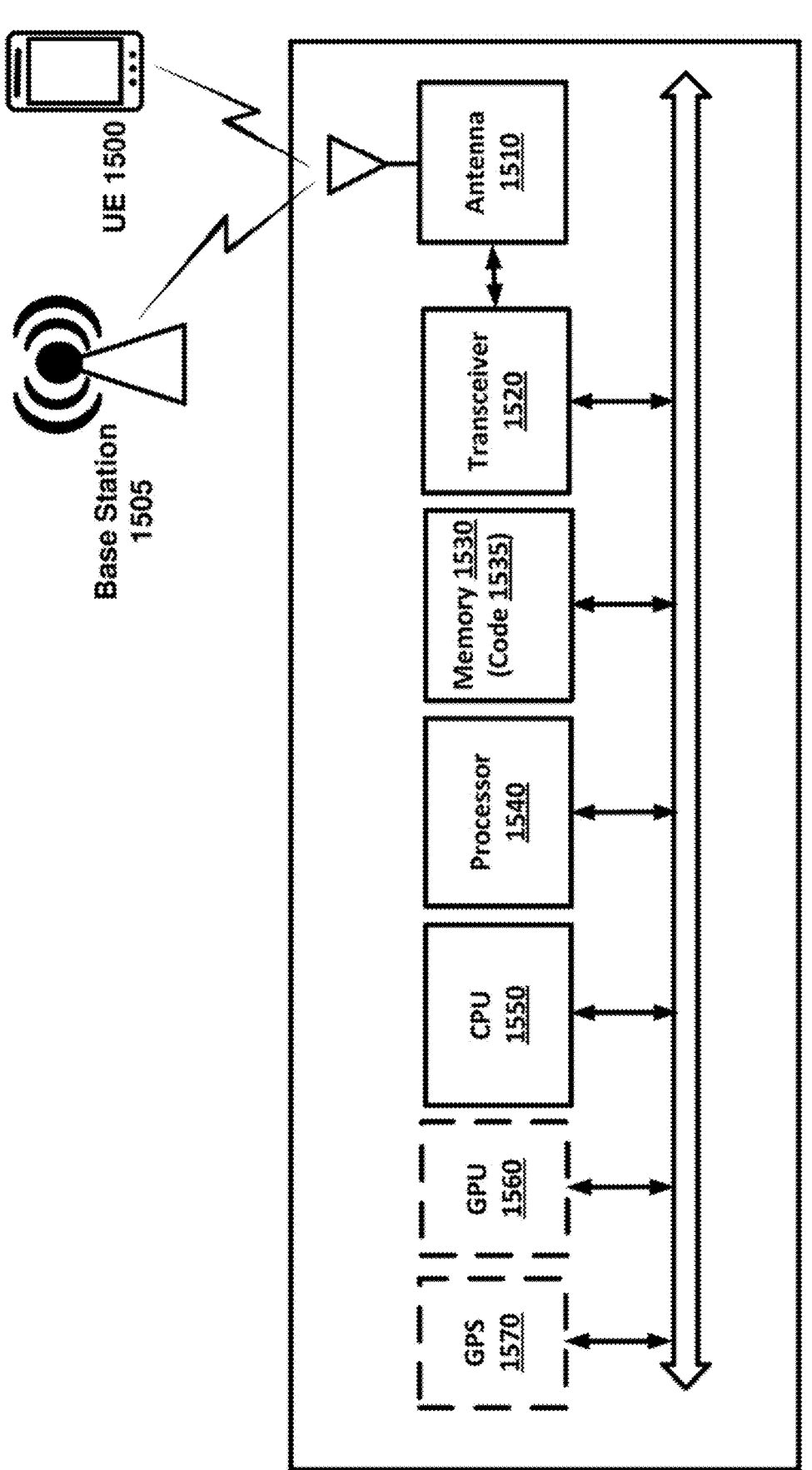
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. All or a subset of blocks and functions in FIG. 15 may be in the base station 1505 and the user equipment 1500 and may be performed by the user equipment 1500 and by the base station 1505. The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1510 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some examples, MBS services may be enabled via single-cell transmission. MBS may be transmitted in the coverage of a single cell. One or more Multicast/Broadcast control channels (e.g., MCCHs) and one or more Multicast/Broadcast data channels (e.g., MTCHs) may be mapped on DL-SCH. The scheduling may be done by the gNB. The Multicast/Broadcast control channel and the Multicast/Broadcast data channel transmissions may be indicated by a logical channel specific RNTI on PDCCH. In some examples, a one-to-one mapping between a service identifier such as a temporary mobile group identifier (TMGI) and a RAN level identifier such as a group identifier (G-RNTI) may be used for the reception of the DL-SCH to which a Multicast/Broadcast data channel may be mapped. In some examples, a single transmission may be used for DL-SCH associated with the Multicast/Broadcast control channel and/or the Multicast/Broadcast data channel transmissions and HARQ or RLC retransmissions may not be used and/or an RLC Unacknowledged Mode (RLC UM) may be used. In other examples some feedback (e.g., HARQ feedback or RLC feedback) may be used for transmissions via Multicast/Broadcast control channel and/or Multicast/Broadcast data channels.

In some example, for Multicast/Broadcast data channel, the following scheduling information may be provided on Multicast/Broadcast control channel: a Multicast/Broadcast data channel scheduling cycle, a Multicast/Broadcast data channel on-duration (e.g., duration that the UE waits for, after waking up from DRX, to receive PDCCHs), a Multicast/Broadcast data channel inactivity timer (e.g., duration that the UE waits to successfully decode a PDCCH, from the last successful decoding of a PDCCH indicating the DL-SCH to which this Multicast/Broadcast data channel is mapped, failing which it re-enters DRX).

In some examples, one or more UE identities may be related to MBS transmissions. The one or more identities may comprise at least one of: one or more first RNTIs that identify transmissions of the Multicast/Broadcast control channel; one or more second RNTIs that identify transmissions of a Multicast/Broadcast data channels. The one or more first RNTIs that identify transmissions of the Multicast/Broadcast control channel may comprise a single cell RNTI (SC-RNTI, other names may be used). The one or more second RNTIs that identify transmissions of a Multicast/Broadcast data channels may comprise a G-RNTI (nG-RNTI or other names may be used).

In some examples, one or more logical channels may be related to MBS transmissions. The one or more logical channels may comprise a Multicast/Broadcast control channel. The Multicast/Broadcast control channel may be a point-to-multipoint downlink channel used for transmitting MBS control information from the network to the UE, for one or several Multicast/Broadcast data channel. This channel may be used by UEs that receive or are interested to receive MBS. The one or more logical channels may comprise a Multicast/Broadcast data channel. This channel may be a point-to-multipoint downlink channel for transmitting MBS traffic data from the network.

Figure 16:
FIG. 16 shows an example MBS interest indication signaling according to some aspects of some of various exemplary embodiments of the present disclosure.

In some examples, a procedure may be used by the UE to inform RAN that the UE is receiving or is interested to receive MBS service(s) via an MBS radio bearer, and if so, to inform the 5G RAN about the priority of MBS versus unicast reception or MBS service(s) reception in receive only mode. An example is shown in FIG. 16. The UE may transmit a message (e.g., an MBS interest indication message) message to inform RAN that the UE is receiving/interested to receive or no longer receiving/interested to receive MBS service(s). The UE may transmit the message based on receiving one or more messages (e.g., a SIB message or a unicast RRC message) from the network for example indicating one or more MBS Service Area Identifiers of the current and/or neighboring carrier frequencies.

In some examples, the UE may consider an MBS service to be part of the MBS services of interest if the UE is capable of receiving MBS services (e.g., via a single cell point to multipoint mechanism); and/or the UE is receiving or interested to receive this service via a bearer associated with MBS services; and/or one session of this service is ongoing or about to start; and/or at least one of the one or more MBS service identifiers indicated by network is of interest to the UE.

In some examples, control information for reception of MBS services may be provided on a specific logical channel: (e.g., a MCCH). The MCCH may carry one or more configuration messages which indicate the MBS sessions that are ongoing as well as the (corresponding) information on when each session may be scheduled, e.g., scheduling period, scheduling window and start offset. The one or more configuration messages may provide information about the neighbor cells transmitting the MBS sessions which may be ongoing on the current cell. In some examples, the UE may receive a single MBS service at a time, or more than one MBS services in parallel.

In some examples, the MCCH information (e.g., the information transmitted in messages sent over the MCCH) may be transmitted periodically, using a configurable repetition period. The MCCH transmissions (and the associated radio resources and MCS) may be indicated on PDCCH.

In some examples, change of MCCH information may occur at specific radio frames/subframes/slots and/or a modification period may be used. For example, within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by a SIB or by RRC signaling.

In some examples, when the network changes (some of) the MCCH information, it may notify the UEs about the change in the first subframe/slot which may be used for MCCH transmission in a repetition period. Upon receiving a change notification, a UE interested to receive MBS services may acquire the new MCCH information starting from the same subframe/slot. The UE may apply the previously acquired MCCH information until the UE acquires the new MCCH information.

In an example, a system information block (SIB) may contain the information required to acquire the control information associated transmission of MBS. The information may comprise at least one of: one or more discontinuous reception (DRX) parameters for monitoring for scheduling information of the control information associated transmission of MBS, scheduling periodicity and offset for scheduling information of the control information associated transmission of MBS, modification period for modification of content of the control information associated transmission of MBS, repetition information for repetition of the control information associated transmission of MBS, etc.

In an example, an information element (IE) may provide configuration parameters indicating, for example, the list of ongoing MBS sessions transmitted via one or more bearers for each MBS session, one or more associated RNTIs (e.g., G-RNTI, other names may be used) and scheduling information. The configuration parameters may comprise at least one of: one or more timer values for discontinuous reception (DRX) (e.g., an inactivity timer or an On Duration timer), an RNTI for scrambling the scheduling and transmission of a Multicast/Broadcast traffic channel (e.g., MTCH, other names may be used), ongoing MBS session, one or more power control parameters, one or more scheduling periodicity and/or offset values for one or more MBS traffic channels, information about list of neighbor cells, etc.

In some examples a gNB or ng-eNB may comprise logical nodes that host some, all or parts of the user plane and/or control plane functionalities. For example, a gNB Central Unit (gNB-CU) may be a logical node hosting RRC, SDAP and PDCP protocols of the gNB or RRC and PDCP protocols of the en-gNB that controls the operation of one or more gNB-DUs. The gNB-CU may terminate the F1 interface connected with the gNB-DU. A gNB Distributed Unit (gNB-DU) may be a logical node hosting RLC, MAC and PHY layers of the gNB or en-gNB, and its operation may be partly controlled by gNB-CU. One gNB-DU may support one or multiple cells. One cell may be supported by only one gNB-DU. The gNB-DU may terminate the F1 interface connected with the gNB-CU. A gNB-CU-Control Plane (gNB-CU-CP) may be a logical node hosting the RRC and the control plane part of the PDCP protocol of the gNB-CU for an en-gNB or a gNB. The gNB-CU-CP may terminate the E1 interface connected with the gNB-CU-UP and the F1-C interface connected with the gNB-DU. A gNB-CU-User Plane (gNB-CU-UP) may be a logical node hosting the user plane part of the PDCP protocol of the gNB-CU for an en-gNB, and the user plane part of the PDCP protocol and the SDAP protocol of the gNB-CU for a gNB. The gNB-CU-UP may terminate the E1 interface connected with the gNB-CU-CP and the F1-U interface connected with the gNB-DU.

Figure 17:
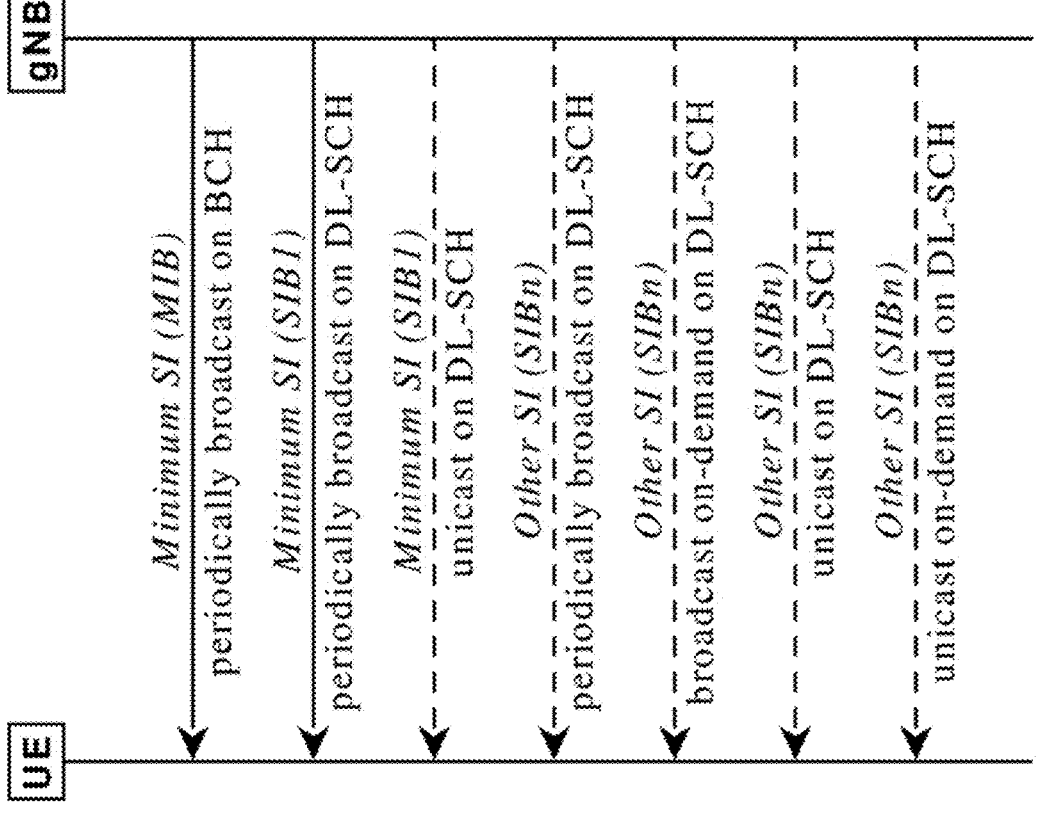
FIG. 17 shows an example system information provisioning according to some aspects of some of various exemplary embodiments of the present disclosure.

In some examples, System Information (SI) may comprise a MIB and a number of SIBs, which may be divided into Minimum SI and Other SI. An example of system information provisioning is show in FIG. 17.

In some examples, Minimum SI may comprise basic information required for initial access and information for acquiring any other SI. In some examples, Minimum SI may comprise MIB and SIB1. MIB may contain cell barred status information and essential physical layer information of the cell required to receive further system information, e.g. CORESET #0 configuration. MIB may be periodically broadcast on BCH. SIB1 may define the scheduling of other system information blocks and may contain information required for initial access. SIB1 may also be referred to as Remaining Minimum SI (RMSI) and may be periodically broadcast on DL-SCH or may be sent in a dedicated manner on DL-SCH to UEs in RRC_CONNECTED.

In some examples, Other SI may encompass all SIBs not broadcast in the Minimum SI. Those SIBs may either be periodically broadcast on DL-SCH, broadcast on-demand on DL-SCH (e.g., upon request from UEs in RRC_IDLE, RRC_INACTIVE, or RRC_CONNECTED), or sent in a dedicated manner on DL-SCH to UEs in RRC_CON-NECTED (e.g., upon request, if configured by the network, from UEs in RRC_CONNECTED or when the UE has an active BWP with no common search space configured). In some examples, Other SI may comprise SIB2-SIB14 and SIBpos. One or more additional SIBs including SIB(s) associated with one or more MBS services may be defined/ used by example embodiments. In some examples, SIB2 may contain cell re-selection information, mainly related to the serving cell; SIB3 may contain information about the serving frequency and intra-frequency neighboring cells relevant for cell re-selection (including cell re-selection parameters common for a frequency as well as cell specific re-selection parameters); SIB4 may contain information about other NR frequencies and inter-frequency neighboring cells relevant for cell re-selection (including cell re-selection parameters common for a frequency as well as cell specific re-selection parameters), which may also be used for NR idle/inactive measurements; SIB5 may contain information about E-UTRA frequencies and E-UTRA neighboring cells relevant for cell re-selection (including cell re-selection parameters common for a frequency as well as cell specific re-selection parameters); SIB6 may contain an ETWS pri-mary notification; SIB7 may contain an ETWS secondary notification; SIB8 may contain a CMAS warning notifica-tion; SIB9 may contain information related to GPS time and Coordinated Universal Time (UTC); SIB10 may contain the Human-Readable Network Names (HRNN) of the NPNs listed in SIB1; SIB11 may contains information related to idle/inactive measurements; SIBpos may contain position-ing assistance data. For sidelink, Other SI may include: SIB12 which may contain information related to NR side-link communication; SIB13 which may contain information related to SystemInformationBlockType21 for V2X sidelink communication; SIB14 may contain information related to SystemInformationBlockType26 for V2X sidelink commu-nication.

In some examples, for a cell/frequency that is considered for camping by the UE, the UE may not be required to acquire the contents of the minimum SI of that cell/fre-quency from another cell/frequency layer. This does not preclude the case that the UE applies stored SI from previ-ously visited cell(s).

In some examples, if the UE cannot determine the full contents of the minimum SI of a cell by receiving from that cell, the UE may consider that cell as barred.

In some examples in case of bandwidth adaptation (BA), the UE may acquire SI on the active BWP.

In some examples, the MIB may be mapped on the BCCH and carried on BCH while other SI messages may be mapped on the BCCH, where they may be dynamically carried on DL-SCH. The scheduling of SI messages part of Other SI may be indicated by SIB1.

In some examples, for UEs in RRC_IDLE and RRC_I-NACTIVE, a request for Other SI may trigger a random access procedure where MSG3 may include the SI request message unless the requested SI is associated to a subset of the PRACH resources, in which case MSG1 is used for indication of the requested Other SI. When MSG1 is used, the minimum granularity of the request may be one SI message (i.e., a set of SIBs), one RACH preamble and/or PRACH resource may be used to request multiple SI mes-sages and the gNB acknowledges the request in MSG2. When MSG 3 is used, the gNB may acknowledge the request in MSG4.

In some examples, for UEs in RRC_CONNECTED, a request for Other SI may be sent to the network, if config-ured by the network, in a dedicated manner (i.e., via UL-DCCH) and the granularity of the request may be one SIB. The gNB may respond with an RRCReconfiguration includ-ing the requested SIB(s). It may be a network choice to decide which requested SIBs may be delivered in a dedi-cated or broadcasted manner.

In some examples, the Other SI may be broadcast at a configurable periodicity and for a certain duration. The Other SI may also be broadcast when it is requested by UE in RRC_IDLE/RRC_INACTIVE/RRC_CONNECTED.

In some examples, for a UE to be allowed to camp on a cell it may have acquired the contents of the Minimum SI from that cell. There may be cells in the system that do not broadcast the Minimum SI and where the UE therefore cannot camp.

In some examples, change of system information may occur at specific radio frames, i.e., the concept of a modi-fication period is used. System information may be trans-mitted a number of times with the same content within a modification period, as defined by its scheduling. The modi-fication period may be configured by system information.

In some examples, when the network changes (some of the) system information, it first may notify the UEs about this change, i.e., this may be done throughout a modification period. In the next modification period, the network may transmit the updated system information. Upon receiving a change notification, the UE may acquire the new system information from the start of the next modification period. The UE may apply the previously acquired system infor-mation until the UE acquires the new system information.

In some examples, System Information (SI) may be divided into the MIB and a number of SIBs and posSIBs where: the MIB may be transmitted on the BCH with a periodicity (e.g., of 80 ms) and repetitions made within 80 ms and it may include parameters that are needed to acquire SIB1 from the cell. The SIB1 may be transmitted on the DL-SCH. SIBs other than SIB1 and posSIBs may be carried in SystemInformation (SI) messages, which may be trans-mitted on the DL-SCH. SIBs and posSIBs may be mapped to the different SI messages. Each SI message may be transmitted within periodically occurring time domain win-dows (referred to as SI-windows with same length for all SI messages). Each SI message may be associated with an SI-window and the SI-windows of different SI messages may not overlap. That is, within one SI-window the corre-sponding SI message is transmitted. An SI message may be transmitted a number of times within the SI-window. Any SIB or posSIB except SIB1 may be configured to be cell specific or area specific, using an indication in SIB1. The cell specific SIB may be applicable within a cell that may provide the SIB while the area specific SIB is applicable within an area referred to as SI area, which may consist of one or several cells and may be identified by systemInformationAreaID.

In some examples, the mapping of SIBs to SI messages may be configured in schedulingInfoList, while the mapping of posSIBs to SI messages may be configured in posSchedulingInfoList. Each SIB may be contained in a single SI message and each SIB and posSIB may be contained at most once in that SI message.

In some examples, for a UE in RRC_CONNECTED, the network may provide system information through dedicated signaling using the RRCReconfiguration message, e.g., if the UE has an active BWP with no common search space configured to monitor system information, paging, or upon request from the UE.

In some examples, for PSCell and SCells, the network may provide the required SI by dedicated signaling, i.e. within an RRCReconfiguration message. The UE may acquire MIB of the PSCell to get SFN timing of the SCG (which may be different from MCG). Upon change of relevant SI for SCell, the network may release and may add the concerned SCell. For PSCell, the required SI may be changed with Reconfiguration with Sync.

In some examples, SIB1 may contain information relevant when evaluating if a UE is allowed to access a cell and may define the scheduling of other system information. It also may contain radio resource configuration information that is common for all UEs and barring information applied to the unified access control.

In some examples, systemInformationAreaID IE may indicate the system information area that the cell belongs to, if any. Any SIB with areaScope within the SI is considered to belong to this systemInformationAreaID. The systemInformationAreaID may be unique within a PLMN.

In some examples, the IE SI-SchedulingInfo may be included in SIB1. The IE SI-SchedulingInfo may contain information needed for acquisition of SI messages. A field areaScope may indicate that a SIB is area specific. If the field is absent, the SIB may be cell specific. A field si-BroadcastStatus may indicate if the SI message is being broadcasted or not. Change of si-BroadcastStatus may not result in system information change notifications in Short Message transmitted with P-RNTI over DCI. The value of the indication may be valid until the end of the BCCH modification period when set to broadcasting. A field si-Periodicity may indicate periodicity of the SI-message in radio frames. A field ra-AssociationPeriodIndex may indicate index of the association period in the si-RequestPeriod in which the UE may send the SI request for SI message(s) corresponding to this SI-RequestResources, using the preambles indicated by ra-PreambleStartIndex and each occasions indicated by ra-ssb-OccasionMaskIndex. A field ra-PreambleStartIndex, if N SSBs are associated with a RACH occasion, where N>=1, for the i-th SSB (i=0, . . . , N−1) the preamble with preamble index=ra-PreambleStartIndex+i is used for SI request; For N<1, the preamble with preamble index=ra-PreambleStartIndex is used for SI request. A field si-RequestConfig may indicate configuration of Msg1 resources that the UE uses for requesting SI-messages for which si-BroadcastStatus is set to notBroadcasting. A field systemInformationAreaID may indicate the system information area that the cell belongs to, if any. Any SIB with areaScope within the SI is considered to belong to this systemInformationAreaID. The systemInformationAreaID may be unique within a PLMN.

Example embodiments enhance MBS system and configuration signaling to support selective MBS transmission across cells and/or beams and/or Bandwidth Parts (BWPs) for a plurality of MBS services.

In some examples, depending on the type of MBS data and its QoS and traffic characteristic and available spectrum, the multicast or broadcast transmissions may be configured on in different bands, on different carriers or bandwidth parts.

In some examples, the transmission of MBS data may take into account the presence and/or the number of interested users (e.g., users interested in MBS services or one or more particular MBS services) in the coverage area.

In some examples, based on distribution and presence of users' demand/interest and/or other considerations, the MBS data may be selectively transmitted on some base stations, cells or select Distributed Units (DUs), or beams within a cell.

In some examples, based on characteristic of MBS data, mixed capabilities of target devices and/or other considerations, different MBS data types may be configured for transmission on the different spectrum, carriers or BWPs.

In some examples, the MBS signaling design may support configuration of MBS transmission on selective set of beams and/or DU and/or cells of a gNB.

In some examples, MBS signaling design may support configuration of MBS transmission on one or multiple carriers or bandwidth parts.

Figure 18:
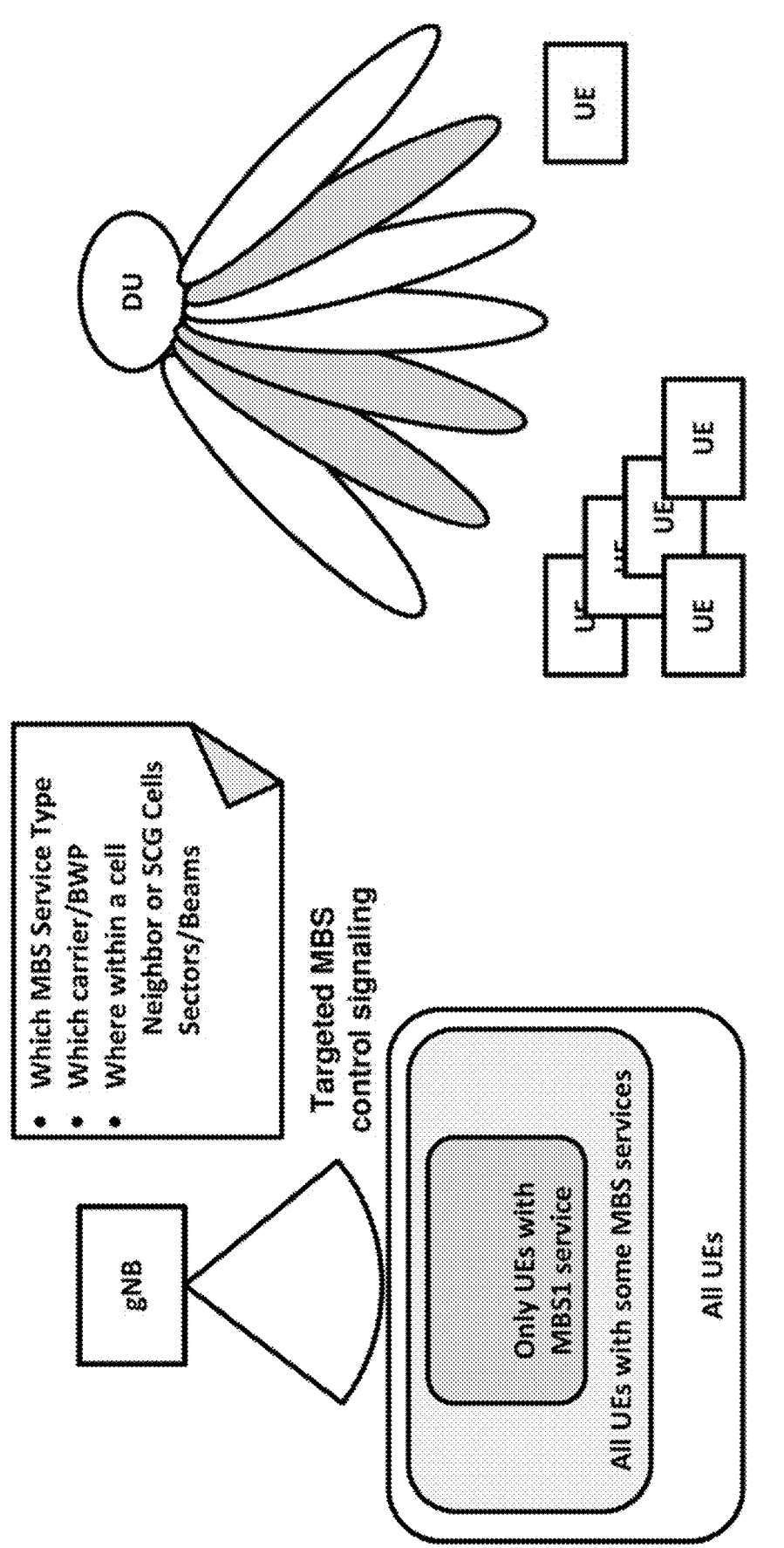
FIG. 18 shows an example process according to some aspects of some of various exemplary embodiments of the present disclosure.

In some examples, 5G Networks may provide a variety of broadcast and multicast services and use cases targeting different groups of sometime many users and devices. In some examples, service type or group targeted MBS control signaling design may be such that unnecessary processing by UEs not interested or not affected by such signaling may be avoided. In some examples, the MBS signaling design may support service type or group targeted signaling such that unnecessary processing by non-affected UEs may be avoided. An example is shown in FIG. 18.

In this disclosure, the MBS Configuration may be used to refer to MBS radio bearer and control configuration, e.g., MBS QoS, MCCH/MTCH configuration, SPS configuration, etc. The MBS Notification may be an initial signaling to inform UEs about an upcoming detailed MBS session/configurate change or update.

Figure 19:
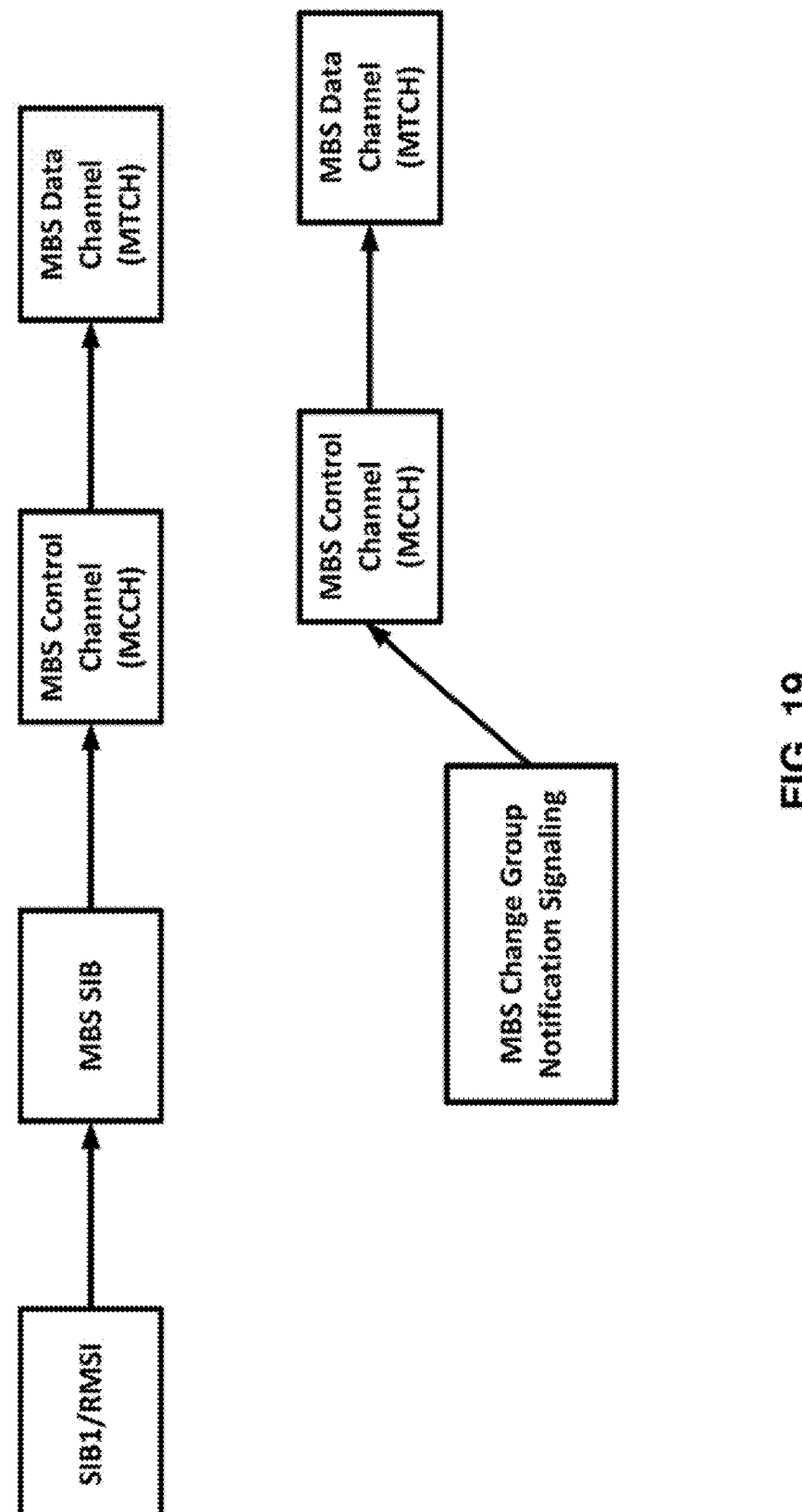
FIG. 19 shows an example process according to some aspects of some of various exemplary embodiments of the present disclosure.

In some examples, MBS signaling configuration information may be grouped into multiple parts and provided to UE at different stages. An example is shown in FIG. 19. For example, the system information block 1 (SIB1) and/or remaining minimum system information (RMSI) may show if MBS related system information (SIB) is applicable to the cell. The MBS SIB, may provide configuration and scheduling information for MBS Control Signaling, e.g., carrying MCCH logical channel. The MBS notification signaling may be used to indicate changes to MBS configuration. The MBS Control Signaling, may provide configuration and scheduling information for MBS Traffic Channels, e.g., carrying MTCH logical channel. The MBS Data/Traffic transmission may carry MTCH logical channel.

In some examples, at least for broadcast, services System Information (SIB) messaging may be used to provide MBS Control configuration and MCCH type messaging to provide MBS scheduling information.

In some examples, at least for broadcast services, the System Information framework may be used to provide UE with MBS control signaling transmission, e.g., MCCH configuration. An MBS SIB may be treated as Other System Information (OSI) and as such its transmission schedule and on demand requesting information may be provided as part of SIB1 or RMSI.

In some examples, the presence of such information in RMSI may be an implicit indication that a node supports some MBS services. In some examples, a base station may be associated with multiple carriers and/or with beamforming. In some examples, the MBS may be offered on some carriers or bandwidth parts (BWPs) of carrier and transmissions may also be selective on some distributed units of beams within a gNB. In some examples, to support MBS, the SIB1/RMSI may be extended to include information about scheduling and requesting information of MBS SIB. For example, a sibType n along with its scheduling and requesting information may be added to SI-SchedulingInfo.

In some examples, a variety of different MBS services for different use cases targeting different users may be offered. For example, one types of MBS service may target IoT and V2X devices and other type may be video broadcasting. In an example, to enable optimization of the SI for MBS UEs may be informed upfront about which MBS Service types are being supported by the network where type may be preconfigured or may be indicated through the higher layer service announcement.

In some examples, the RMSI may include information about MBS service group/types configured and supported by the RAN, where the MBS Service Type index, e.g. A, B and C, may be defined by upper layer signaling or may be preconfigured. In some examples, different reserved sibTypes for different MBS service group/types configured in the cell may be used. In some examples, a bit map code may be included in the sibType specific portion of RMSI for MBS-SIB where each bit set to 1 may indicate that the corresponding MBS Service type is configured in the cell.

In some examples, different MBS services may be expected to be offered in a multibeam base stations. In some cases, the MBS may be offered on some beams or sectors/ DUs of a gNB selectively based on presence of interested users. In such case UEs interested in MBS may need to be informed about such subset of beams/DUs upfront so that they can take that into account as they perform any cell reselection as needed to continue receiving their MBS data.

In some examples, in a multisector or multibeam base station the MBS-SIB scheduling information in RMSI may include information about the set of sectors and beams where MBS is transmitted. In the absence of this information the UE may assume MBS is offered in all beams within the sector but not necessarily across different sectors of a gNB. In some examples, the systemInformationAreaID in RMSI, may be used and extended which may define the multi-cell area in which a sibType is applied, to encode sub-cell level area, e.g., subset of sectors/beams in a base station. In some examples, a separate bitmap may be defined and may include in the MBS SIB scheduling information to encode the area in which MBS SIB applies.

In some examples, for Broadcast services UE may perform DU/Beam selection based on UE's interest. For Multicast service UE may select the beam and DU based on UE's Interest and may indicate to gNB if it moves to a DU/Beam where target multicast data is not currently transmitted. In some examples, the RMSI may include information about the carrier/BWP and beams, where MBS SIB is transmitted. If such information is not present the UE may assume the MBS SIB is transmitted on the same BWP and where RMSI is received and across all SSB beams.

In some examples, the RMSI information about MBS SIB may be simplified and differentiation among different MBS services may be deferred to be included in MBS SIB only. An example is shown in FIG. 20. In this case, MBS users regardless of which MBS service group they are interested or receiving would obtain and process an all-inclusive MBS SIB before they find out if their target service is included.

In some examples, the RMSI may be simple and generic without pointing to specific service types or beams and may defer such information to MBS SIB itself. The MBS SIB may be transmitted in carriers in which RMSI is transmitted. Such approach while providing more flexibility than the RMSI approach may require all UEs interested in any MBS service to find and process MBS SIB transmitted on one or more beams to find if it includes any information about availability of their target MBS services. The RMSI approach although less flexible is simple and may be used if all MBS services are similarly offered across all DUs and beams of a gNB.

In some examples, using parameters in the MBS SIB, the gNB may list the MBS transmission configuration for one or multiple MBS service groups, e.g., may provide scheduling information for multiple MCCHs.

In some examples, information about spatial transmission pattern across sectors, DUs or beams of a gNB may be included in the MBS SIB on a per MBS service group basis.

In some examples, to help UEs with cell selection and reselection while maintaining MBS service continuity, the network may provide information about availability of MBS services in neighboring cells with the same or different configuration. The nodes broadcasting such MBS configuration may not be directly involved in MBS scheduling and transmission.

In some examples, the MBS-SIB may include the information about availability of each MBS service group in neighbor cells and if the same configuration applies to such neighbor cells.

In some examples, in Dual Connectivity and Carrier aggregation, the MBS SIB may be sent by Master PCell providing MBS configuration for all the MBS supporting cells in master cell group and/or secondary cell group as applicable.

In some examples, 5G MBS services may be offered on multiple carriers and different BWPs. The MBS data transmission may or may not be on the same BWP where MCCH is transmitted. Therefore, the MCCH may include the BWP for MTCH if different than the one that the MCCH is transmitted.

In some examples, the MBS SIB may include information about the carrier and BWP where MBS control information, e.g., MCCH, is transmitted. If such information is not present for an MBS type/group, the UEs may assume the MCCH and MCCH change notifications for that MBS type/group are transmitted on the same BWP where it received the MBS SIB.

In some examples, different UEs may be configured with different bandwidth parts (BWPs) based on their capabilities, power saving optimization and mix of services each use at the given time. The UEs may be expected to operate on one of their configured BWPs, called active BWP. The network may transmit MBS control information, e.g., MCCH on multiple BWPs or carriers to ensure all target UEs receive the MBS control scheduling information.

Figure 21:
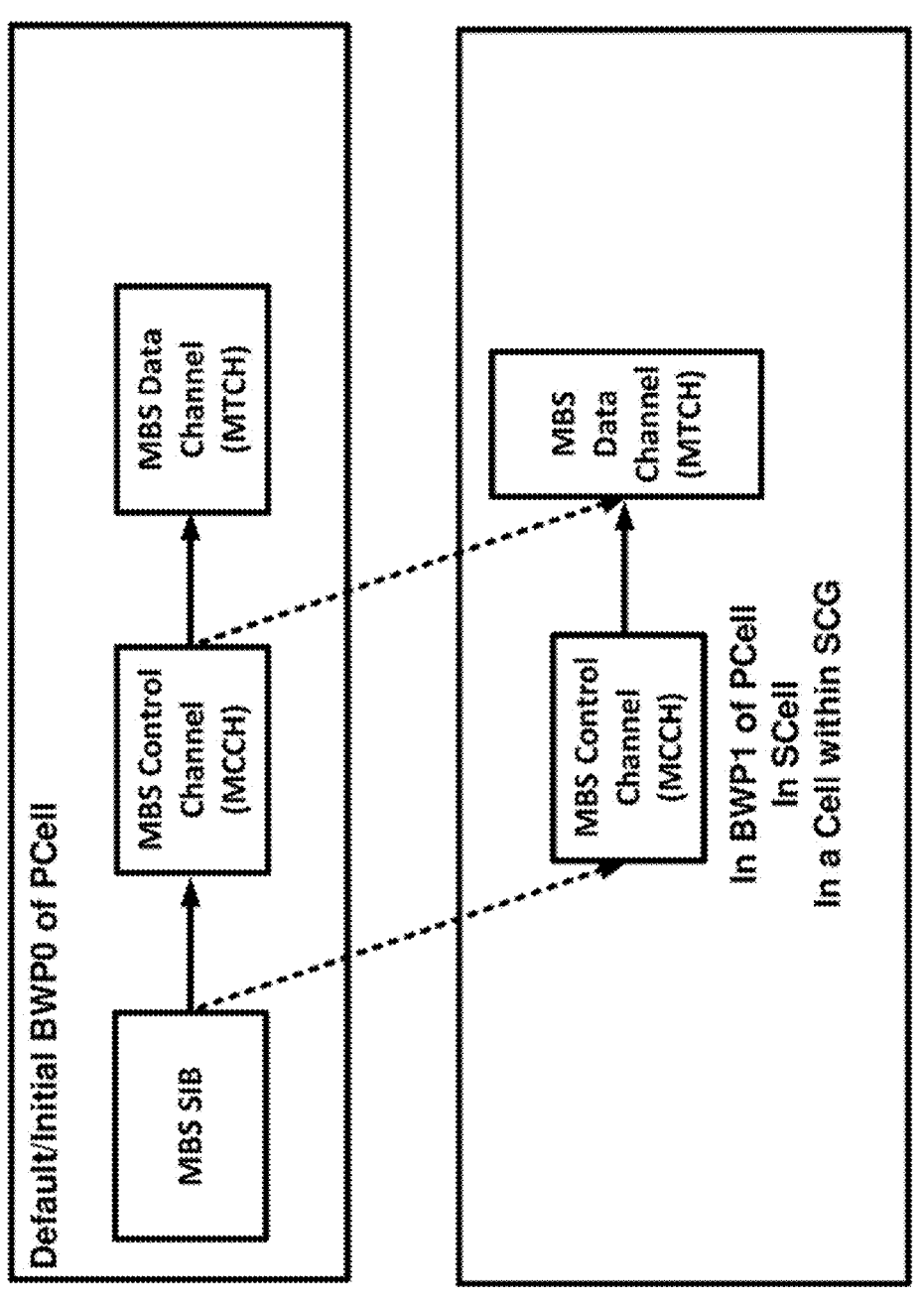
FIG. 21 shows an example process according to some aspects of some of various exemplary embodiments of the present disclosure.

In some examples, while MBS data for different service groups may be transmitted across different BWPs the corresponding MBS control signaling, e.g., on MCCH, may be transmitted on a common BWP. An example is shown in FIG. 21.

In some examples, MBS Configuration updates, e.g., MCCH change notification, may be transmitted across multiple cells, beams and over multiple paging occasions and bandwidth parts as needed to ensure all target UE receive such notification.

In some examples, MBS scheduling information, e.g., MCCH, may include pointer to BWP where MTCH is transmitted and may be transmitted across multiple BWPs or carriers.

System information may be required for scheduling control information and data for multicast broadcast services. Existing system information including system information blocks (SIBs) may not be sufficient for flexible scheduling of MBS data. There is a need to enhance the existing system information and corresponding procedures to enable more flexible scheduling of MBS data. Example embodiments may enhance the existing system information and corresponding procedures to enable more flexible scheduling of MBS data.

Figure 22:
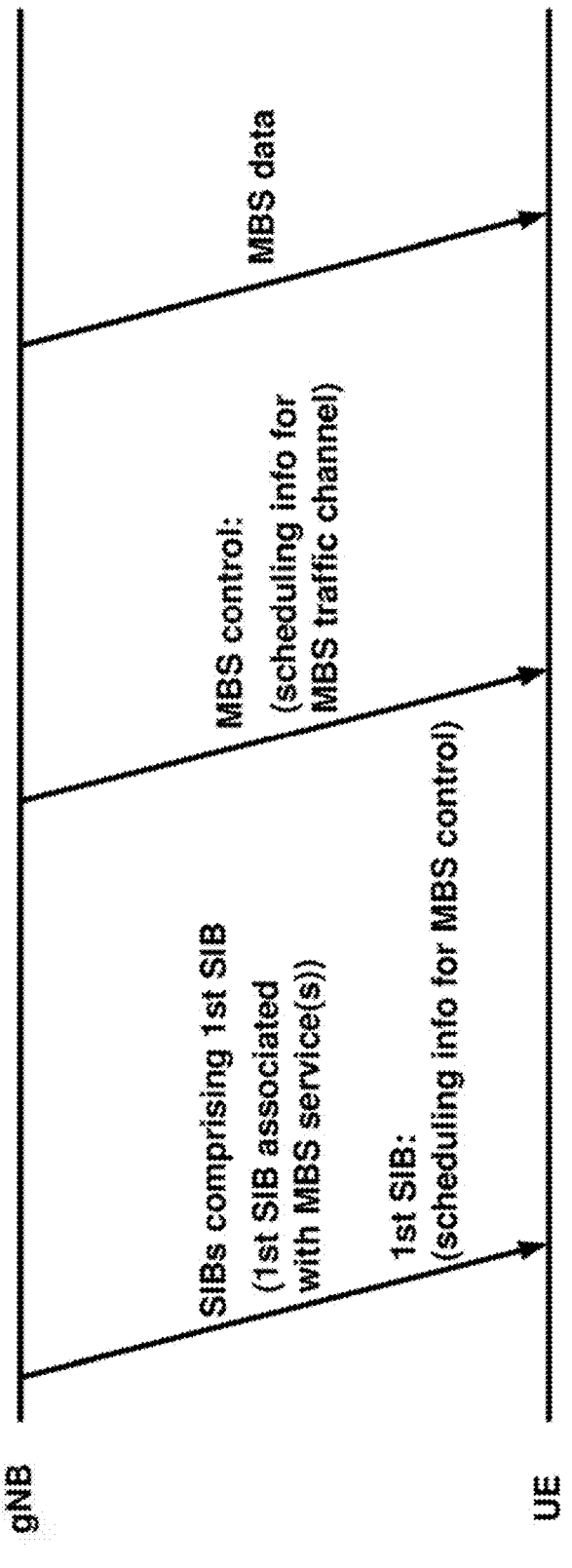
FIG. 22 shows an example process according to some aspects of some of various exemplary embodiments of the present disclosure.

In an example embodiment as shown in FIG. 22, a UE, while in an RRC state, may receive system information. In some examples, the RRC state may be an RRC_CONNECTED state. In some examples, the RRC state may be an RRC_IDLE state or an RRC_INACTIVE state. The system information, received by the UE, may comprise a plurality of SIBs comprising a first SIB. The first SIB may be associated with one or more MBS services and/or may be used for scheduling data associated with the one or more MBS services. The first SIB may comprise and/or may indicate scheduling information (e.g., indicating radio resources used) for reception of an MBS control/MBS control configuration parameters.

In some examples, the UE may receive (e.g., prior to reception of the first SIB), first system information (e.g., via MIB/BCH or via SIB1 or via RMSI (remaining system information)) indicating that at least one SIB that is associated with one or more MBS services is applicable and/or is to be received via a first cell. In some examples, the first cell may be a primary cell. In some examples, the first cell may be a primary cell or a secondary cell. In some examples, the first cell may be a primary cell and the information in the first SIB may be applicable to other cells (e.g., secondary cells in the same cell group, e.g., MCG or SCG). The UE may receive the system information via a broadcast channel (e.g., in case of MIB) or via a physical downlink shared channel (e.g., in the case of SIB1 or RMSI). In some examples, the first system information may comprise scheduling information and/or may indicate radio resources for reception of the first SIB.

The UE may receive the MBS control channel based on the scheduling information included in and/or indicated by the first SIB. In some examples, the MBS control channel may be a multicast control channel (MCCH). The MBS control channel may be used for transmission of scheduling information (e.g., indicating radio resources) for reception of MBS data, e.g., transport blocks comprising one or more logical channels associated with one or more MBS services. The MBS control channel may comprise and/or indicate scheduling information for reception of a multicast traffic channel (MTCH). In some examples, the MBS control channel may further comprise and/or indicate one or more MBS configuration parameters. The UE may receive the MBS data based on the scheduling information indicated by the MBS control channel.

In some examples, the base station may comprise a centralized unit (CU) and one or more distributed units (DUs). In some examples, the first cell may be associated with a plurality of beams. In some examples, the first system information (e.g., received via MIB or SIB1 or RMSI) and/or the first SIB, associated with the one or more MBS services, and/or the information indicated by the MBS control channel may be used for transmission of first parameters that are beam-specific or distributed unit (DU)-specific. For example, one or more parameters in the first system information (e.g., received via MIB or SIB1 or RMSI) and/or the first SIB, associated with the one or more MBS services, and/or the information indicated by the MBS control channel may indicate that the first parameters are beam-specific or distributed unit (DU)-specific. For example, the one or more parameters may indicate one or more DU identifiers and/or one or more beam identifiers. In some examples, the absence of the one or more parameters in the first system information (e.g., received via MIB or SIB1 or RMSI) and/or the first SIB, associated with the one or more MBS services, and/or the information indicated by the MBS control channel may indicate that the first parameters are not beam-specific or DU-specific and/or that the first parameters are applicable to all beams of the first cell and/or all DUs of the base station.

In some examples, the first system information (e.g., received via MIB or SIB1 or RMSI) and/or the first SIB, associated with the one or more MBS services, and/or the information indicated by the MBS control channel may be used for transmission of first parameters that are MBS service specific. An MBS service may be associated with V2X or IoT. For example, one or more parameters in the first system information (e.g., received via MIB or SIB1 or RMSI) and/or the first SIB, associated with the one or more MBS services, and/or the information indicated by the MBS control channel may indicate that the first parameters are MBS service specific. For example, the one or more parameters may indicate one or more MBS service identifiers. In some examples, the absence of the one or more parameters in the first system information (e.g., received via MIB or SIB1 or RMSI) and/or the first SIB, associated with the one or more MBS services, and/or the information indicated by the MBS control channel may indicate that the first parameters are not MBS service specific and/or that the first parameters are applicable to all MBS services (e.g., in the one or more MBS services associated with the first SIB).

In some examples, the first cell may comprise and/or may be associated with a plurality of bandwidth parts (BWPs). In some examples, the first system information (e.g., received via MIB or SIB1 or RMSI) and/or the first SIB, associated with the one or more MBS services, and/or the information indicated by the MBS control channel may be used for transmission of first parameters that are bandwidth part (BWP) specific. For example, one or more parameters in the first system information (e.g., received via MIB or SIB1 or RMSI) and/or the first SIB, associated with the one or more MBS services, and/or the information indicated by the MBS control channel may indicate that the first parameters are BWP specific. For example, the one or more parameters may indicate one or more BWP identifiers. In some examples, the absence of the one or more parameters in the first system information (e.g., received via MIB or SIB1 or RMSI) and/or the first SIB, associated with the one or more MBS services, and/or the information indicated by the MBS control channel may indicate that the first parameters are not BWP specific and/or that the first parameters are applicable to all BWPs of the first cell.

In some examples, the first SIB may indicate information about availability of a first MBS service in a neighboring cell. The UE may utilize this information in handover and/or cell reselection procedure.

In some examples, the UE may further receive MBS notification signaling indicating a change and/or an update to one or more MBS configuration parameters associated with one or more MBS services. The reception of the MBS data may further be based on the changed and/or updated MBS configuration parameters indicated by the MBS notification signaling. The MBS notification signaling may be received via a system information (e.g., via a broadcast channel) or paging via a downlink shared channel.

Figure 23:
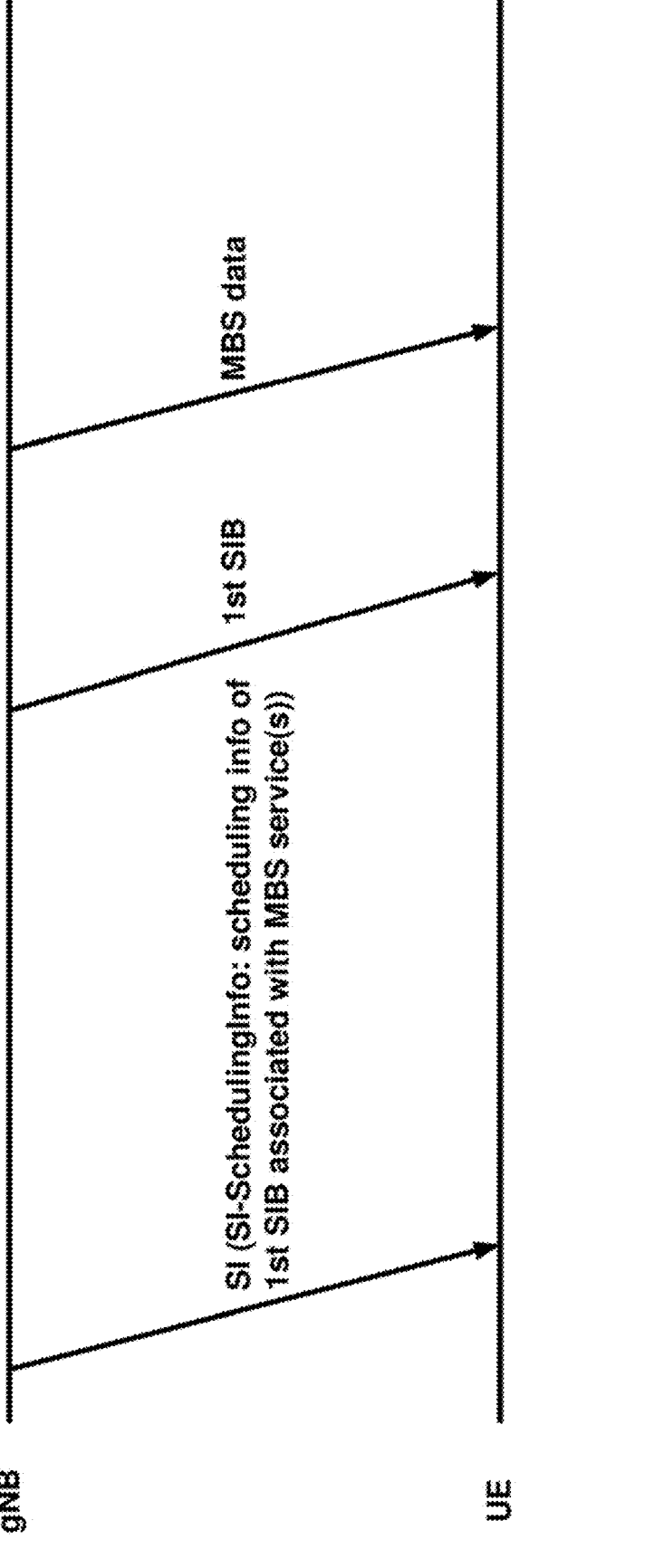
FIG. 23 shows an example process according to some aspects of some of various exemplary embodiments of the present disclosure.

In an example embodiment as shown in FIG. 23, a UE, while in an RRC state, may receive system information (e.g., via SIB1 or RMSI). In some examples, the RRC state may be an RRC_CONNECTED state. In some examples, the RRC state may be an RRC_IDLE state or an RRC_INAC-TIVE state. The system information, received by the UE, may comprise a SI-SchedulingInfo information element (IE). The SI-SchedulingInfo IE may comprise scheduling information for one or more SIBs comprising a first SIB. The first SIB may be associated with and/or may comprise information associated with one or more MBS services. The UE may receive the first SIB based on the scheduling information included in the SI-SchedulingInfo IE. The UE may utilize the information included in the first SIB and may receive MBS data based on the first SIB and associated with an MBS service of the one or more MBS services.

Figure 24:
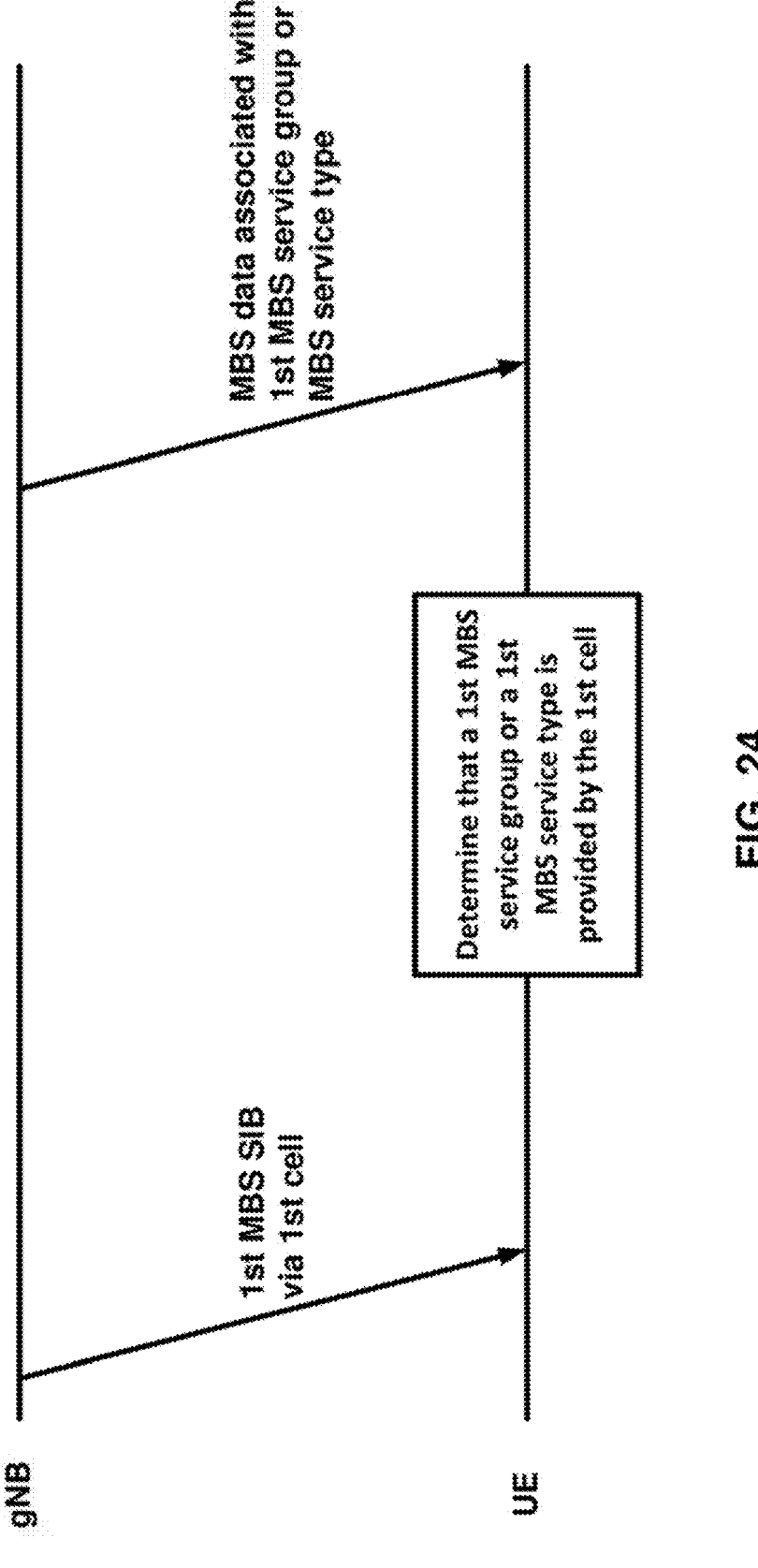
FIG. 24 shows an example process according to some aspects of some of various exemplary embodiments of the present disclosure.

In an example embodiment as shown in FIG. 24, a UE, while in an RRC state, may receive one or more SIBs comprising a first MBS SIB via a first cell. In some examples, the RRC state may be an RRC_CONNECTED state. In some examples, the RRC state may be an RRC_IDLE state or an RRC_INACTIVE state. In response to and based on receiving the first MBS SIB, the UE may determine that a first MBS service group or an MBS service type is provided by the first cell. In some examples, the first SIB may comprise parameters for receiving MBS data that is associated with the first MBS service group or first MBS service type. The UE may receive MBS data, associated with the first MBS service group or first MBS service type, based on the first MBS SIB.

In some examples, a plurality of SIBs, including the first MBS SIB, may be associated with MBS services and/or may be referred to as MBS SIBs. Each MBS SIB in the plurality of MBS SIBs may be associated with a corresponding MBS service group or MBS service. The first MBS SIB may be associated with the first MBS service group or first MBS service type and the UE may determine that the first MBS service group or the first MBS service type is provided by the first cell based on receiving the first MBS SIB.

In some examples, the first MBS SIB may comprise a bitmap comprising a plurality of bits. Each bit in the plurality of bits may be associated with a corresponding MBS service type or MBS service group. A first bit in the plurality of bits may be associated with the first MBS service type or the first MBS service group and the UE may determine that the first MBS service type or the first MBS service group is provided by the first cell based on the first bit having a first value (e.g., one).

Figure 25:
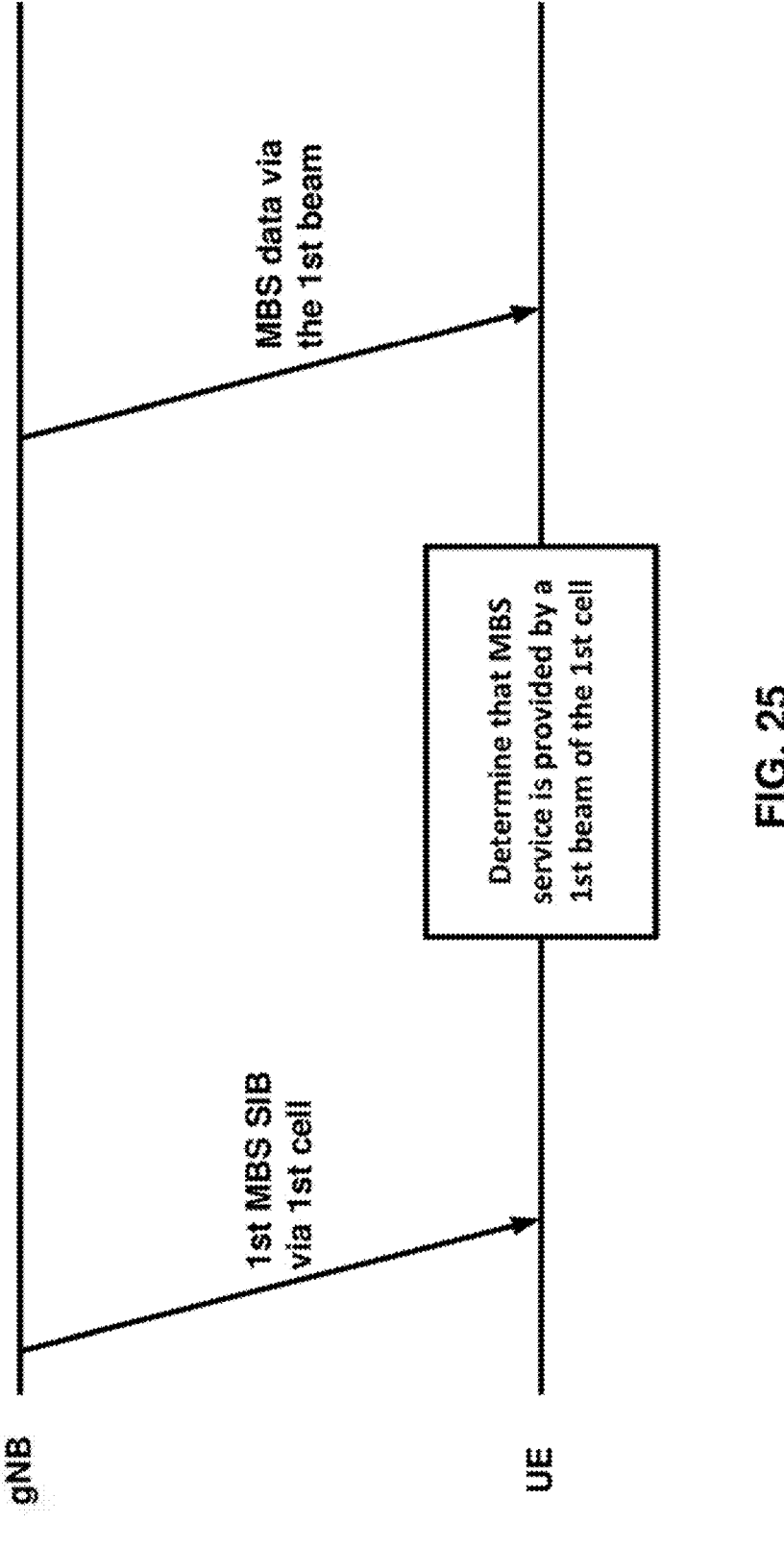
FIG. 25 shows an example process according to some aspects of some of various exemplary embodiments of the present disclosure.

In an example embodiment as shown in FIG. 25, a UE, while in an RRC state, may receive one or more SIBs comprising a first MBS-related SIB via a first cell. In some examples, the RRC state may be an RRC_CONNECTED state. In some examples, the RRC state may be an RRC_IDLE state or an RRC_INACTIVE state. In response to and based on receiving the first MBS-related SIB, the UE may determine that an MBS service is provided by the first cell. In some examples, the first SIB may comprise parameters for receiving MBS data that is associated with the first beam. The UE may receive MBS data, associated with the first beam, based on the first MBS SIB.

In some examples, the first MBS SIB may comprise a bitmap comprising a plurality of bits. Each bit in the plurality of bits may be associated with a corresponding beam. A first bit in the plurality of bits may be associated with the first beam and the UE may determine that the MBS service is provided by the first beam based on the first bit having a first value (e.g., one).

In an example embodiment, a user equipment (UE) may receive, from a base station (BS), a plurality of system information blocks (SIBs) comprising a first SIB that is associated with one or more MBS services, wherein the first SIB may comprise scheduling information for reception of MBS control configuration parameters. The UE may receive an MBS control channel comprising scheduling information for reception of an MBS traffic channel via a first cell. The UE may receive MBS data based on the scheduling information.

In some examples, the UE may receive first system information associated with the first cell, wherein the first system information may indicate that at least one system information block (SIB) associated with one or more multicast broadcast services (MBS) services is applicable to the first cell. In some examples, the first system information may be based on a system information block one (SIB1). In some examples, the first system information may be based on a remaining system information (RMSI). In some examples, the first system information may be received prior to the first system information block (SIB). In some examples, receiving the first system information may be via a physical downlink shared channel. In some examples, receiving the first system information may be via a broadcast channel.

In some examples, the first system information block (SIB) further comprises one or more multicast broadcast services (MBS) configuration parameters.

In some examples, the multicast broadcast services (MBS) control channel may be associated with a multicast control channel (MCCH) logical channel.

In some examples, the multicast broadcast services (MBS) traffic channel may be associated with a multicast traffic channel (MTCH) logical channel. In some examples, the receiving the multicast broadcast services (MBS) data may be based on the multicast traffic channel (MTCH) logical channel.

In some examples, the UE may receive multicast broadcast services (MBS) notification signaling indicating a change or an update to the multicast broadcast services (MBS) control configuration parameters. In some examples, receiving the multicast broadcast services (MBS) notification signaling may be based on one or more of a paging channel, a broadcast channel and a downlink shared channel.

In some examples, at least one of the first system information, the first system information block (SIB) and the multicast broadcast services (MBS) control channel may be used for transmission of first parameters that are beam-specific or distributed unit (DU)-specific. In some examples, the base station may comprise a centralized unit (CU) and one or more distributed units (DUs). In some examples, one or more parameters in the at least one of the first system information, the first system information block (SIB) and the multicast broadcast services (MBS) control channel may indicate that the first parameters are beam-specific or distributed unit (DU)-specific. In some examples, the one or more parameters may indicate one or more beam or distributed unit (DU) identifiers. In some examples, absence of the one or more parameters may indicate that the first parameters are not beam-specific or distributed unit (DU)-specific.

In some examples, at least one of the first system information, the first system information block (SIB) and the multicast broadcast services (MBS) control channel may be used for transmission of first parameters that are MBS service specific. In some examples, the multicast broadcast services (MBS) service may be associated with one of vehicle to everything (V2X) service type and an internet of things (IoT) service type. In some examples, one or more parameters in the at least one of the first system information, the first system information block (SIB) and the multicast broadcast services (MBS) control channel may indicate that the first parameters are MBS service specific. In some examples, the one or more parameters may indicate one or more MBS service identifiers. In some examples, absence of the one or more parameters may indicate that the first parameters are not multicast broadcast services (MBS) service specific.

In some examples, at least one of the first system information, the first system information block (SIB) and the multicast broadcast services (MBS) control channel may be used for transmission of first parameters that are bandwidth part (BWP)-specific. In some examples, the first cell may be associated with a plurality of bandwidth parts (BWPs). In some examples, one or more parameters in the at least one of the first system information, the first system information block (SIB) and the multicast broadcast services (MBS) control channel may indicate that the first parameters are bandwidth part (BWP) specific. In some examples, the one or more parameters may indicate one or more bandwidth part (BWP) identifiers. In some examples, absence of the one or more parameters may indicate that the first parameters are not bandwidth part (BWP) specific.

In some examples, the first system information block (SIB) may comprise information about availability of a first MBS service in a neighboring cell.

In some examples, the first cell may be a primary cell in a cell group. In some examples, the cell group may be a master cell group (MCG) provided by a master base station. In some examples, the cell group may be a secondary cell group (SCG) provided by a secondary base station.

In an example embodiment, a user equipment (UE) may receive system information comprising a system information scheduling information (SI-SchedulingInfo) information element (IE) comprising first scheduling information for receiving a first system information block (SIB) that is associated with one or more MBS services. The UE may receive the first SIB based on the first scheduling information. The UE may receive MBS data based on the first SIB.

In some examples, receiving the system information may be via a system block one (SIB1) message.

In some examples, receiving the system information may be via remaining system information (RMSI).

In an example embodiment, a user equipment (UE) may receive, from a base station (BS), a first MBS system information block (SIB) via a first cell. The UE may determine that a first MBS service group or a first MBS service type is provided by the first cell based on receiving the first MBS SIB. The UE may receive MBS data, associated with the first MBS service group or the first MBS service type, based on the first MBS SIB.

In some examples, a plurality of system information blocks (SIBs), comprising the first MBS SIB, may be multicast broadcast services (MBS) SIBs. Each MBS SIB, in the plurality of MBS SIBs, may be associated with a corresponding MBS service group or MBS service type. The first MBS SIB may be associated with the first MBS service group or the first MBS service type.

In some examples, the first MBS SIB may comprise a bitmap comprising a plurality of bits. Each bit in the plurality of bits may be associated with a corresponding MBS service group or MBS service type. A first bit, in the plurality of bits, may be associated with the first MBS service group or MBS service type. The determining may be based on the first bit having a first value. In some examples, the first value may be one.

In an example embodiment, a user equipment (UE) may receive, from a base station (BS), a first MBS-related system information block (SIB) via a first cell. The UE may determine that MBS data is provided by a first beam associated with the first cell based on receiving the first MBS-related SIB. The UE may receive MBS data, via the first beam of the first cell, based on the first MBS-related SIB.

In some examples, the MBS-related SIB may comprise a bitmap comprising a plurality of bits. Each bit in the plurality of bits may be associated with a corresponding beam. A first bit, in the plurality of bits, may be associated with the first beam. The determining may be based on the first bit having a first value. In some examples, the first value may be one.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The invention claimed is:

1. A method for signaling system information for multicast broadcast services (MBS), comprising:
   receiving, by a user equipment (UE) from a base station (BS) via a primary cell, a first system information block (SIB) associated with one or more MBS services, wherein the first SIB is configured to be cell specific to a secondary cell different from the primary cell and comprises scheduling information for reception of an MBS control channel;
   applying the first SIB to the secondary cell;

receiving, by the UE from the BS via the secondary cell, the MBS control channel comprising scheduling information for reception of an MBS traffic channel; and
   receiving, by the UE from the BS, MBS data based on the scheduling information for reception of the MBS traffic channel.

2. The method of claim 1, further comprising
   receiving, by the UE from the BS, information indicating that the first SIB is applicable to the secondary cell.

3. The method of claim 2, wherein the information is received via a physical downlink shared channel.

4. The method of claim 2, wherein the information is received via a broadcast channel.

5. The method of claim 1, wherein the MBS control channel is associated with a multicast control channel (MCCH) logical channel.

6. The method of claim 1, wherein the multicast broadcast services (MBS) traffic channel is associated with a multicast traffic channel (MTCH) logical channel.

7. The method of claim 1, further comprising
   receiving MBS notification signaling indicating a change or an update to MBS control configuration parameters.

8. The method of claim 1, wherein the primary cell is a primary cell in a master cell group (MCG) provided by a master base station.

9. The method of claim 1, wherein the primary cell is a primary cell in a secondary cell group (SCG) provided by a secondary base station.

10. A method for signaling system information for multicast broadcast services (MBS), comprising:
   transmitting, by a base station (BS) to a user equipment (UE) via a primary cell, a first system information block (SIB) associated with one or more MBS services, wherein the first SIB is configured to be cell specific to a secondary cell and comprises scheduling information for reception of an MBS control channel;
   transmitting, by the BS to the UE via the secondary cell, the MBS control channel comprising scheduling information for reception of an MBS traffic channel on the secondary cell, based on the scheduling information in the first SIB; and
   transmitting, by the BS to the UE, MBS data based on the scheduling information for reception of the MBS traffic channel.

11. A user equipment (UE) comprising:
   receiving circuitry configured to receive, from a base station (BS), via a primary cell, a first system information block (SIB) associated with one or more multicast broadcast services (MBS), wherein the first SIB is configured to be cell specific to a secondary cell and comprises scheduling information for reception of an MBS control channel; and
   applying circuitry configured to apply the first SIB to the secondary cell,
   wherein the receiving circuitry is further configured to:
   receive, from the BS, via the secondary cell, the MBS control channel comprising scheduling information for reception of an MBS traffic channel; and
   receive, from the BS, MBS data based on the scheduling information for reception of the MBS traffic channel.

12. A base station (BS) comprising:
   transmitting circuitry configured to transmit, to a user equipment (UE), via a primary cell, a first system information block (SIB) associated with one or more multicast broadcast services (MBS), wherein the first SIB is configured to be cell specific to a secondary cell and comprises scheduling information for reception of an MBS control channel;

wherein the transmitting circuitry is further configured to:

transmit, to the UE, via the secondary cell, the MBS control channel comprising scheduling information for reception of an MBS traffic channel on the secondary cell, based on the scheduling information in the first SIB; and transmit, to the UE, MBS data based on the scheduling information for reception of the MBS traffic channel.

\* \* \* \* \*